US011978141B2

United States Patent
Saharia et al.

(10) Patent No.: US 11,978,141 B2
(45) Date of Patent: May 7, 2024

(54) GENERATING IMAGES USING SEQUENCES OF GENERATIVE NEURAL NETWORKS

(71) Applicant: Google LLC, Mountain View, CA (US)

(72) Inventors: Chitwan Saharia, Toronto (CA); William Chan, Toronto (CA); Mohammad Norouzi, Richmond Hill (CA); Saurabh Saxena, Toronto (CA); Yi Li, Oakville (CA); Jay Ha Whang, Austin, TX (US); David James Fleet, Toronto (CA); Jonathan Ho, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/199,883

(22) Filed: May 19, 2023

(65) Prior Publication Data

US 2023/0377226 A1 Nov. 23, 2023

Related U.S. Application Data

(60) Provisional application No. 63/344,038, filed on May 19, 2022.

(51) Int. Cl.
| | |
|---|---|
| *G06T 11/60* | (2006.01) |
| *G06F 40/284* | (2020.01) |
| *G06F 40/40* | (2020.01) |
| *G06N 3/08* | (2023.01) |
| *G06T 3/40* | (2006.01) |
| *G06T 3/4053* | (2024.01) |
| *G06T 5/00* | (2006.01) |

(52) U.S. Cl.
CPC ............ *G06T 11/60* (2013.01); *G06F 40/284* (2020.01); *G06F 40/40* (2020.01); *G06N 3/08* (2013.01); *G06T 3/4053* (2013.01); *G06T 5/002* (2013.01)

(58) Field of Classification Search
CPC ....... G06T 11/60; G06T 3/4053; G06T 5/002; G06F 40/284; G06F 40/40; G06N 3/08
See application file for complete search history.

(56) References Cited

U.S. PATENT DOCUMENTS

| 2019/0251721 | A1* | 8/2019 | Hua | G06T 5/002 |
| 2020/0342328 | A1* | 10/2020 | Revaud | G06F 18/22 |
| 2021/0272253 | A1* | 9/2021 | Lin | G06V 40/161 |
| 2022/0028367 | A1* | 1/2022 | Shekhar | G10L 13/047 |
| 2022/0092267 | A1* | 3/2022 | Hou | G06F 40/279 |

(Continued)

OTHER PUBLICATIONS

Zhan et al. "Multimodal Image Synthesis and Editing—A Survey", Dec. 27, 2020, arXiv (Year: 2020).*

(Continued)

*Primary Examiner* — YuJang Tswei
(74) *Attorney, Agent, or Firm* — Fish & Richardson P.C.

(57) ABSTRACT

Methods, systems, and apparatus, including computer programs encoded on a computer storage medium, for generating images. In one aspect, a method includes: receiving an input text prompt including a sequence of text tokens in a natural language; processing the input text prompt using a text encoder neural network to generate a set of contextual embeddings of the input text prompt; and processing the contextual embeddings through a sequence of generative neural networks to generate a final output image that depicts a scene that is described by the input text prompt.

18 Claims, 14 Drawing Sheets

(56) References Cited

U.S. PATENT DOCUMENTS

| | | | | |
|---|---|---|---|---|
| 2022/0108262 | A1* | 4/2022 | Cella | G06Q 10/063118 |
| 2023/0123820 | A1* | 4/2023 | Wang | G06N 3/08 |
| | | | | 345/474 |
| 2023/0230198 | A1* | 7/2023 | Zhang | G10L 15/22 |
| | | | | 382/276 |

OTHER PUBLICATIONS

Salimans et al. ("Progressive Distillation for Fast Sampling of Diffusion Models", Feb. 1, 2022, google (Year: 2022).*

Liu et al., A Survey on Contextual Embeddings—Apr. 13, 2020—arXiv (Year: 2020).*

Kohl, Accuracy Evaluation of Numerical Simulation Methods with CNNs, 2019, Technical University of Munich (Year: 2019).*

Choi et al, "ILVR: Conditioning Method for Denoising Diffusion Probabilistic Models",2021, Samsung (Year: 2021).*

Vlachas et al, Learning the Effective Dynamics of Complex Multiscale Systems—Jul. 1, 2020, researchgate.net (Year: 2020).*

Xiao et al, Tackling the Generative Learning Trilemma With Denoising Diffusion GANS—Apr. 4, 2022, arXiv (Year: 2022).*

Aka et al., "Measuring Model Biases in the Absence of Ground Truth," AIES '21: Proceedings of the 2021 AAAI/ACM Conference on AI, Ethics, and Society, Jul. 2021, 327-335.

Bender et al., "On the Dangers of Stochastic Parrots: Can Language Models Be Too Big?," FAccT '21: Proceedings of the 2021 ACM Conference on Fairness, Accountability, and Transparency, Mar. 2021, 610-623.

Bengio et al., "Scheduled sampling for sequence prediction with recurrent neural networks," Advances in Neural Information Processing Systems, Dec. 2015, 9 pages.

Birhane et al., "Multimodal datasets: misogyny, pornography, and malignant stereotypes," CoRR, submitted on Oct. 5, 2021, arXiv:2110.01963v1, 33 pages.

Bordia et al., "Identifying and Reducing Gender Bias in Word-Level Language Models," CoRR, submitted on Apr. 5, 2019, arXiv:1904.03035v1, 12 pages.

Brock et al., "Large Scale GAN Training for High Fidelity Natural Image Synthesis," CoRR, submitted on Feb. 25, 2019, arXiv:1809.11096v2, 35 pages.

Brown et al., "Language Models are Few-Shot Learners," Advances in Neural Information Processing Systems, Dec. 2020, 25 pages.

Buolamwini et al., "Gender Shades: Intersectional Accuracy Disparities in Commercial Gender Classification," Proceedings of the 1st Conference on Fairness, Accountability and Transparency (PMLR), Feb. 2018, 81:1-15.

Chen et al., "WaveGrad: Estimating Gradients for Waveform Generation," CoRR, submitted on Oct. 9, 2020, arXiv:2009.00713v2, 15 pages.

Cho et al., "DALL-Eval: Probing the Reasoning Skills and Social Biases of Text-to- Image Generation Models," Proceedings of the IEEE/CVF International Conference on Computer Vision (ICCV), Oct. 2023, 3043-3054.

Chowdhery et al., "PaLM: Scaling Language Modeling with Pathways," CoRR, submitted on Apr. 19, 2022, arXiv:2204.02311v3, 83 pages.

Crowson et al., "VQGAN-CLIP: Open Domain Image Generation and Editing with Natural Language Guidance," Proceedings of the ECCV, Oct. 2022, 2249-2281.

De Bortoli et al., "Diffusion Schrödinger Bridge with Applications to Score-Based Generative Modeling," Advances in Neural Information Processing Systems, Dec. 2021, 15 pages.

De Fauw et al., "Hierarchical Autoregressive Image Models with Auxiliary Decoders," CoRR, submitted on Oct. 8, 2019, arXiv:1903.04933v2, 32 pages.

Denton et al., "Deep Generative Image Models using a Laplacian Pyramid of Adversarial Networks," Advances in Neural Information Processing Systems, Dec. 2015, 9 pages.

Devlin et al., "BERT: Pre-training of Deep Bidirectional Transformers for Language Understanding," Proceedings of NAACL-HLT, Jun. 2019, 4171-4186.

Dhariwal et al., "Diffusion models beat gans on image synthesis," Advances in Neural Information Processing Systems, Dec. 2021, 15 pages.

Ding et al., "CogView: Mastering Text-to-Image Generation via Transformers," Advances in Neural Information Processing Systems, Dec. 2021, 14 pages.

Dinh et al., "Density estimation using Real NVP," CoRR, submitted on Feb. 27, 2017, arXiv:1605.08803v3, 32 pages.

Dulhanty, "Issues in Computer Vision Data Collection: Bias, Consent, and Label Taxonomy," Thesis for the degree of Master of Applied Science in Systems Design Engineering, University of Waterloo, Sep. 30, 2020, 91 pages.

Esser et al., "Taming Transformers for High-Resolution Image Synthesis," Proceedings of the IEEE/CVF Conference on Computer Vision and Pattern Recognition (CVPR), Jun. 2021, 12873-12883.

Franks et al., "Sex, lies and videotape: deep fakes and free speech delusions," Maryland Law Review, 2019, 78(4):892-898.

Fu et al., "Language-Driven Image Style Transfer," Proceedings of the ICLR, Sep. 28, 2021, 14 pages.

Gafni et al., "Make-A-Scene: Scene-Based Text-to-Image Generation with Human Priors," CoRR, submitted on Mar. 24, 2022, arXiv:2203.13131v1, 17 pages.

Gao et al., "Learning Energy-Based Models by Diffusion Recovery Likelihood," CoRR, submitted on Mar. 27, 2021, arXiv:2012.08125v2, 25 pages.

Gebru et al., "Datasheets for datasets," CoRR, submitted on Dec. 1, 2021, arXiv:1803.09010v8, 18 pages.

Goodfellow et al., "Generative adversarial nets," Advances in Neural Information Processing Systems, Deceember 2014, pp. 2672-2680.

Gou et al., "SegAttnGAN: Text to Image Generation with Segmentation Attention," CoRR, submitted on May 25, 2020, arXiv:2005.12444v1, 5 pages.

Hendricks et al., "Women also Snowboard: Overcoming Bias in Captioning Models," Proceedings of the European Conference on Computer Vision (ECCV), Sep. 2018, 771-787.

Hessel et al., "CLIPScore: A Reference-free Evaluation Metric for Image Captioning," CoRR, submitted on Mar. 23, 2022, arXiv:2104.08718v3, 15 pages.

Heusel et al., "GANs Trained by a Two Time-Scale Update Rule Converge to a Local Nash Equilibrium," Advances in Neural Information Processing Systems, Dec. 2017, 12 pages.

Ho et al., "Cascaded diffusion models for high fidelity image generation," The Journal of Machine Learning Research, Jan. 2022, 23:2249-2281.

Ho et al., "Classifier-Free Diffusion Guidance," CoRR, submitted on Jul. 26, 2022, arXiv:2207.12598v1, 14 pages.

Ho et al., "Denoising diffusion probabilistic models," Advances in Neural Information Processing Systems, Dec. 2020, 12 pages.

Ho et al., "Flow++: Improving Flow-Based Generative Models with Variational Dequantization and Architecture Design," Proceedings of the 36th International Conference on Machine Learning (PMLR), Jun. 2019, 97:2722-2730.

Hughes et al., "Generative Adversarial Networks-Enabled Human-Artificial Intelligence Collaborative Applications for Creative and Design Industries: A Systematic Review of Current Approaches and Trends," Front. Artif. Intell., Apr. 28, 2021, 4:604234, 17 pages.

International Search Report and Written Opinion in International Appln. No. PCT/US2023/022971, mailed on Sep. 1, 2023, 14 pages.

Jia et al., "Scaling Up Visual and Vision-Language Representation Learning With Noisy Text Supervision," Proceedings of the 38th International Conference on Machine Learning (PMLR), Jul. 2021, 139:4904-4916.

Jolicoeur-Martineau et al., "Adversarial score matching and improved sampling for image generation," CoRR, submitted on Oct. 10, 2020, arXiv:2009.05475v2, 29 pages.

Kadkhodaie et al., "Solving Linear Inverse Problems Using the Prior Implicit in a Denoiser," CoRR, submitted on May 7, 2021, arXiv:2007.13640v3, 19 pages.

(56) References Cited

OTHER PUBLICATIONS

Kadkhodaie et al., "Stochastic Solutions for Linear Inverse Problems using the Prior Implicit in a Denoiser," Advances in Neural Information Processing Systems, Dec. 2021, 13 pages.
Kim et al., "DiffusionCLIP: Text-Guided Diffusion Models for Robust Image Manipulation," Proceedings of the IEEE/CVF Conference on Computer Vision and Pattern Recognition (CVPR), Jun. 2022, 2426-2435.
Kingma et al., "Auto-Encoding Variational Bayes," CoRR, submitted on May 1, 2014, arXiv: 1312.6114v10, 14 pages.
Kingma et al., "Glow: Generative Flow with Invertible 1x1 Convolutions," Advances in Neural Information Processing Systems, Dec. 2018, 10 pages.
Kingma et al., "Variational Diffusion Models," Advances in Neural Information Processing Systems, Dec. 2021, 12 pages.
Kong et al., "DiffWave: A Versatile Diffusion Model for Audio Synthesis," CoRR, submitted on Mar. 30, 2021, arXiv:2009.09761v3, 17 pages.
Lin et al., "Microsoft COCO: Common Objects in Context," Proceedings of the European Conference on Computer Vision (ECCV), Sep. 2014, 740-755.
Mansimov et al., "Generating Images from Captions with Attention," CoRR, submitted on Feb. 29, 2016, arXiv:1511.02793v2, 12 pages.
Mao et al., "Learning efficient text-to-image synthesis via interstage cross-sample similarity distillation," Science China Information Sciences, Nov. 17, 2020, 64(2):120102, 12 pages.
Marcus et al., "A very preliminary analysis of DALL-E 2," CORR, submitted on May 2, 2022, arXiv:2204.13807v2, 14 pages.
Menick et al., "Generating High Fidelity Images with Subscale Pixel Networks and Multidimensional Upscaling," CoRR, submitted on Dec. 4, 2018, arXiv:1812.01608v1, 15 pages.
Nichol et al., "GLIDE: Towards Photorealistic Image Generation and Editing with Text-Guided Diffusion Models," CoRR, submitted on Mar. 8, 2022, arXiv:2112.10741v3, 20 pages.
Nichol et al., "Improved Denoising Diffusion Probabilistic Models," Proceedings of the 38th International Conference on Machine Learning (PMLR), 2021, 139:8162- 8171.
Parmar et al., "On Aliased Resizing and Surprising Subtleties in GAN Evaluation," Proceedings of the IEEE/CVF Conference on Computer Vision and Pattern Recognition, Jun. 2022, 11410-11420.
Paullada et al., "Data and its (dis)contents: A survey of dataset development and use in machine learning research," Patterns, Nov. 12, 2021, 2(11):100336, 14 pages.
Prabhu et al., "Large image datasets: A pyrrhic win for computer vision?," CoRR, submitted on Jul. 24, 2020, arXiv:2006.16923v2, 25 pages.
Pushkarna et al., "Data Cards: Purposeful and Transparent Dataset Documentation for Responsible AI," FAccT '22: Proceedings of the 2022 ACM Conference on Fairness, Accountability, and Transparency, Jun. 2022, 1776-1826.
Radford et al., "Improving language understanding by generative pre-training," OpenAI, 2018, 12 pages.
Radford et al., "Language Models are Unsupervised Multitask Learners," OpenAI, 2019, 24 pages.
Radford et al., "Learning to Generate Reviews and Discovering Sentiment," CoRR, submitted on Apr. 6, 2017, arXiv:1704.01444v2, 9 pages.
Radford et al., "Learning Transferable Visual Models From Natural Language Supervision," Proceedings of the 38th International Conference on Machine Learning (PMLR), Jul. 2021, 139:8748-8763.
Rae et al., "Scaling Language Models: Methods, Analysis & Insights from Training Gopher," CoRR, submitted on Jan. 21, 2022, arXiv:2112.11446v2, 120 pages.
Raffel et al., "Exploring the limits of transfer learning with a unified text-to-text transformer," The Journal of Machine Learning Research, Jun. 2020, 21(1):5485- 5551.
Raffel et al., "Online and Linear-Time Attention by Enforcing Monotonic Alignments," Proceedings of the 34th International Conference on Machine Learning (PMLR), Aug. 2017, 70:2837-2846.
Ramesh et al., "Hierarchical text-conditional image generation with CLIP latents," CoRR, submitted on Apr. 13, 2022, arXiv:2204.06125v1, 27 pages.
Ramesh et al., "Zero-Shot Text-to-Image Generation," Proceedings of the 38th International Conference on Machine Learning (PMLR), Jul. 2021, 139:8821-8831.
Ranzato et al., "Sequence Level Training with Recurrent Neural Networks," CoRR, submitted on May 6, 2016, arXiv:1511.06732v7, 16 pages.
Ravuri et al., "Classification Accuracy Score for Conditional Generative Models," Advances in Neural Information Processing Systems, Dec. 2019, 12 pages.
Razavi et al., "Generating Diverse High-Fidelity Images with VQ-VAE-2," Advances in Neural Information Processing Systems, Dec. 2019, 11 pages.
Reed et al., "Generative Adversarial Text to Image Synthesis," Proceedings of The 33rd International Conference on Machine Learning (JMLR), Jun. 2016, 48:1060- 1069.
Rombach et al., "High-Resolution Image Synthesis With Latent Diffusion Models," Proceedings of the IEEE/CVF Conference on Computer Vision and Pattern Recognition, Jun. 2022, 10684-10695.
Ronneberger et al., "U-Net: Convolutional Networks for Biomedical Image Segmentation," Lecture Notes in Computer Science: Proceedings of the International Conference on Medical Image Computing and Computer-Assisted Intervention, Nov. 18, 2015, 9351:234-241.
Russakovsky et al., "ImageNet Large Scale Visual Recognition Challenge," International Journal of Computer Vision, Apr. 11, 2015, 115:211-252.
Saharia et al., "Image Super-Resolution via Iterative Refinement," CoRR, submitted on Jun. 30, 2021, arXiv:2104.07636v2, 28 pages.
Saharia et al., "Palette: Image-to-Image Diffusion Models," SIGGRAPH '22: Acm Siggraph 2022 Conference Proceedings, Aug. 2022, 10 pages.
Salimans et al., "Improved Techniques for Training GANs," Advances in Neural Information Processing Systems, Dec. 2016, 9 pages.
Salimans et al., "PixelCNN++: Improving the PixelCNN with Discretized Logistic Mixture Likelihood and Other Modifications," CoRR, submitted on Jan. 19, 2017, arXiv:1701.05517v1, 10 pages.
Scheuerman et al., "Do Datasets Have Politics? Disciplinary Values in Computer Vision Dataset Development," Proceedings of the ACM on Human-Computer Interaction, Oct. 2021, 5(CSCW2):317, 37 pages.
Schuhmann et al., "LAION-400M: Open Dataset of CLIP-Filtered 400 Million Image-Text Pairs," CoRR, submitted on Nov. 3, 2021, arXiv:2111.02114v1, 5 pages.
Sequiera et al., "Which human faces can AI generate? Lack of diversity in this person does not exist," Proceedings of the 22nd Annual Conference of the Association of Internet Researchers, Sep. 2021, 5 pages.
Sohl-Dickstein et al., "Deep Unsupervised Learning using Nonequilibrium Thermodynamics," Proceedings of the 32nd International Conference on Machine Learning (PMLR), Jul. 2015, 37:2256-2265.
Song et al., "Denoising Diffusion Implicit Models," CoRR, submitted on Feb. 10, 2021, arXiv:2010.02502v2, 22 pages.
Song et al., "Generative Modeling by Estimating Gradients of the Data Distribution," Advances in Neural Information Processing Systems, Dec. 2019, 13 pages.
Song et al., "Improved Techniques for Training Score-Based Generative Models," Advances in Neural Information Processing Systems, Dec. 2020, 11 pages.
Song et al., "Score-Based Generative Modeling through Stochastic Differential Equations," CoRR, submitted on Feb. 10, 2021, srXiv:2011.13456v2, 36 pages.
Srinivasan et al., "Biases in Generative Art: A Causal Look from the Lens of Art History," FAccT '21: Proceedings of the 2021 ACM Conference on Fairness, Accountability, and Transparency, Mar. 2021, 41-51.

(56) References Cited

OTHER PUBLICATIONS

Stanislav et al., "Adversarial text-to-image synthesis: A review," Neural Networks, Aug. 8, 2021, 144:187-209.

Steed et al., "Image Representations Learned With Unsupervised Pre-Training Contain Human-like Biases," FAccT '21: Proceedings of the 2021 ACM Conference on Fairness, Accountability, and Transparency, Mar. 2021, 701-713.

Tao et al., "Df-Gan: A Simple and Effective Baseline for Text-to-Image Synthesis," CoRR, submitted on Mar. 29, 2022, arXiv:2008.05865v3, 11 pages.

Tzen et al., "Neural Stochastic Differential Equations: Deep Latent Gaussian Models in the Diffusion Limit," CoRR, submitted on Oct. 28, 2019, arXiv:1905.09883v2, 18 pages.

Van den Oord et al., "Conditional Image Generation with PixelCNN Decoders," Advances in Neural Information Processing Systems, Dec. 2016, 9 pages.

Van den Oord et al., "Neural Discrete Representation Learning," Advances in Neural Information Processing Systems, Dec. 2017, 10 pages.

Van den Oord et al., "Pixel Recurrent Neural Networks," Proceedings of The 33rd International Conference on Machine Learning (JMLR), Jun. 2016, 48:1747-1756.

Van den Oord et al., "WaveNet: A generative model for raw audio," CoRR, submitted on Sep. 19, 2016, arXiv:1609.03499v2, 15 pages.

Vincent, "A Connection Between Score Matching and Denoising Autoencoders," Neural Computation, Jul. 2011, 23:1661-1674.

Wang et al., "High-Resolution Image Synthesis and Semantic Manipulation With Conditional GANs," Proceedings of the IEEE Conference on Computer Vision and Pattern Recognition (CVPR), Jun. 2018, 8798-8807.

Weston et al., "Wsabie: Scaling Up To Large Vocabulary Image Annotation," Proceedings of the International Joint Conference on Artificial Intelligence, Jul. 2011, 7 pages.

Whang et al., "Deblurring via Stochastic Refinement," Proceedings of the IEEE/CVF Conference on Computer Vision and Pattern Recognition (CVPR), Jun. 2022, 16293-16303.

Wu et al., "LOGAN: Latent Optimisation for Generative Adversarial Networks," CoRR, submitted on Jul. 1, 2020, arXiv:1912.00953v2, 23 pages.

Xin et al., "Hierarchically-fused generative adversarial network for text to realistic image synthesis," Proceedings of the 16th Conference on Computer and Robot Vision, May 2019, 73-80.

Xu et al., "AttnGAN: Fine-Grained Text to Image Generation With Attentional Generative Adversarial Networks," Proceedings of the IEEE Conference on Computer Vision and Pattern Recognition (CVPR), Jun. 2018, 1316-1324.

Ye et al., "Improving Text-to-Image Synthesis Using Contrastive Learning," CoRR, submitted on Nov. 28, 2021, arXiv:2107.02423v2, 10 pages.

Yu et al., "CoCa: Contrastive Captioners are Image-Text Foundation Models," CoRR, submitted on May 4, 2022, arXiv:2205.01917v1, 19 pages.

Yu et al., "LSUN: Construction of a Large-scale Image Dataset using Deep Learning with Humans in the Loop," CoRR, submitted on Jun. 4, 2016, arXiv:1506.03365v3, 9 pages.

Zhang et al., "Cross-Modal Contrastive Learning for Text-to-Image Generation," Proceedings of the IEEE/CVF Conference on Computer Vision and Pattern Recognition (CVPR), Jun. 2021, 833-842.

Zhou et al., "Towards Language-Free Training for Text-to-Image Generation," Proceedings of the IEEE/CVF Conference on Computer Vision and Pattern Recognition (CVPR), Jun. 2022, 17907-17917.

Zhu et al., "Aligning Books and Movies: Towards Story-Like Visual Explanations by Watching Movies and Reading Books," Proceedings of the IEEE International Conference on Computer Vision (ICCV), Dec. 2015, 19-27.

Zhu et al., "DM-GAN: Dynamic Memory Generative Adversarial Networks for Text-To-Image Synthesis," Proceedings of the IEEE/CVF Conference on Computer Vision and Pattern Recognition (CVPR), Jun. 2019, 5802-5810.

\* cited by examiner

102-1: "Sprouts in the shape of text 'Imagen' coming out of a fairytale book."

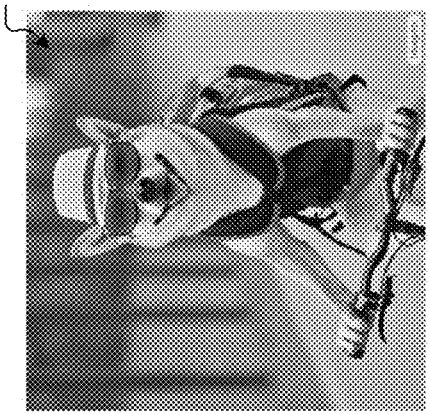

102-2: "A photo of a Shiba Inu dog with a backpack riding a bike. It is wearing sunglasses and a beach hat."

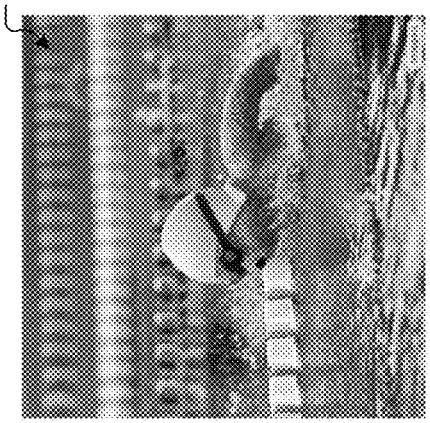

102-3: "Teddy bears swimming at the Olympics 400m Butterfly event."

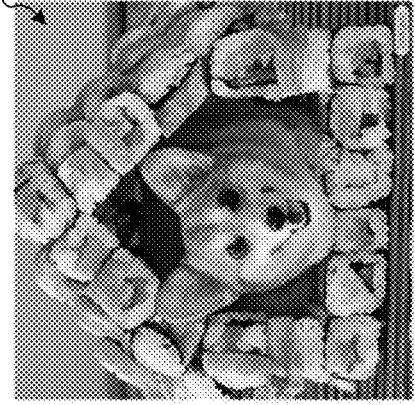

102-4: "A cute corgi lives in a house made out of sushi."

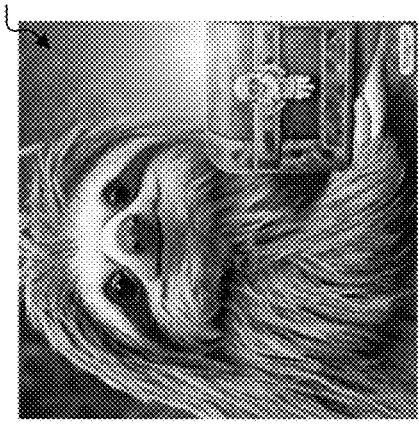

102-5: "A cute sloth holding a small treasure chest. A bright golden glow is coming from the chest."

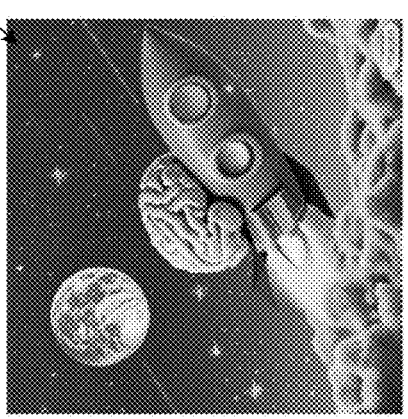

102-6: "A brain riding a rocketship heading towards the moon."

FIG. 7

GENERATING IMAGES USING SEQUENCES OF GENERATIVE NEURAL NETWORKS

CROSS-REFERENCE TO RELATED APPLICATION

This application claims priority to U.S. Provisional Application No. 63/344,038, filed on May 19, 2022. The disclosure of the prior application is considered part of and is incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes an image generation system implemented as computer programs on one or more computers in one or more locations that generates an image from a conditioning input using a text encoder neural network and a sequence of generative neural networks. While the description below describes the conditioning input in the form of a text prompt (or a set of contextual embeddings of a text prompt), in other implementations, the conditioning input can be a different type of data, e.g., a noise input sampled from a noise distribution, a pre-existing image, an embedding of a pre-existing image, a video, an embedding of a video, a numeric representation of a desired object category for the image, an audio signal characterizing a scene that the image should depict, an audio signal that includes a spoken utterance describing the image, an embedding of an audio signal, combinations thereof, and so on. The methods and systems disclosed herein can be applied to any conditioned image generation problem to generate high resolution images.

In one aspect, a method performed by one or more computers is provided. The method includes: receiving an input text prompt including a sequence of text tokens in a natural language; processing the input text prompt using a text encoder neural network to generate a set of contextual embeddings of the input text prompt; and processing the contextual embeddings through a sequence of generative neural networks to generate a final output image that depicts a scene that is described by the input text prompt. The sequence of generative neural networks includes an initial generative neural network and one or more subsequent generative neural networks. The initial generative neural network is configured to: receive the contextual embeddings; and process the contextual embeddings to generate, as output, an initial output image having an initial resolution. The one or more subsequent generative neural networks are each configured to: receive a respective input including: (i) the contextual embeddings, and (ii) a respective input image having a respective input resolution and generated as output by a preceding generative neural network in the sequence; and process the respective input to generate, as output, a respective output image having a respective output resolution that is higher than the respective input resolution.

In some implementations of the method, the text encoder neural network is a self-attention encoder neural network.

In some implementations of the method, the generative neural networks in the sequence have been trained jointly on a set of training examples that each include: (i) a respective training text prompt, and (ii) a respective ground truth image that depicts a scene described by the respective training text prompt; and the text encoder neural network has been pre-trained and was held frozen during the joint training of the generative neural networks in the sequence.

In some implementations of the method, each generative neural network in the sequence is a diffusion-based generative neural network.

In some implementations of the method, the diffusion-based generative neural networks use classifier-free guidance.

In some implementations of the method, for each subsequent diffusion-based generative neural network, processing the respective input to generate, as output, the respective output image includes: sampling a latent image having the respective output resolution; and denoising the latent image over a sequence of steps into the respective output image. Denoising the latent image over the sequence of steps includes, for each step that is not a final step in the sequence of step: receiving a latent image for the step; processing the respective input and the latent image for the step to generate an estimated image for the step; dynamically thresholding pixel values of the estimated image for the step; and generating a latent image for a next step using the estimated image for the step and randomly sampled noise.

In some implementations of the method, denoising the latent image over the sequence of steps includes, for the final step in the sequence of steps: receiving a latent image for the final step; and processing the respective input and the latent image for the final step to generate the respective output image.

In some implementations of the method, processing the respective input and the latent image for the step to generate the estimated image for the step includes: resizing the respective input image to generate a respective resized input image having the respective output resolution; concatenating the latent image for the step with the respective resized input image to generate a concatenated image for the step; and processing the concatenated image for the step with cross-attention on the contextual embeddings to generate the estimated image for the step.

In some implementations of the method, dynamically thresholding the pixel values of the estimated image for the step includes: determining a clipping threshold based on the pixel values of the estimated image for the step; and thresholding the pixel values of the estimated image for the step using the clipping threshold.

In some implementations of the method, determining the clipping threshold based on the pixel values of the estimated image for the step includes: determining the clipping threshold based on a particular percentile absolute pixel value in the estimated image for the step.

In some implementations of the method, thresholding the pixel values of the estimated image for the step using the clipping threshold includes: clipping the pixel values of the estimated image for the step to a range defined by $[-\kappa, \kappa]$, where $\kappa$ is the clipping threshold.

In some implementations of the method, thresholding the pixel values of the estimated image for the step using the clipping threshold further includes: after clipping the pixel values of the estimated image for the step, dividing the pixel values of the estimated image for the step by the clipping threshold.

In some implementations of the method, each subsequent generative neural network applies noise conditioning augmentation to the respective input image.

In some implementations of the method, the final output image is the respective output image of a final generative neural network in the sequence.

In some implementations of the method, each subsequent generative neural network receives a respective k×k input image and generates a respective 4k×4k output image.

In a second aspect, a method performed by one or more computers is provided. The method includes: sampling a noise input from a noise distribution; and processing the noise input through a sequence of generative neural networks to generate a final output image. The sequence of generative neural networks includes an initial generative neural network and one or more subsequent generative neural networks. The initial generative neural network is configured to: receive the noise input; and process the noise input to generate, as output, an initial output image having an initial resolution. The one or more subsequent generative neural networks are each configured to: receive a respective input including: (i) the noise input, and (ii) a respective input image having a respective input resolution and generated as output by a preceding generative neural network in the sequence; and process the respective input to generate, as output, a respective output image having a respective output resolution that is higher than the respective input resolution.

In some implementations of the method, each generative neural network in the sequence is a diffusion-based generative neural network.

In some implementations of the method, the diffusion-based generative neural networks use classifier-free guidance.

In a third aspect, a system is provided. The system includes: one or more computers; and one or more storage devices storing instructions that, when executed by the one or more computers, cause the one or more computers to perform any of the abovementioned methods.

In a fourth aspect, a system is provided. The system includes one or more computer-readable storage media storing instructions that, when executed by one or more computers, cause the one or more computers to perform any of the abovementioned methods.

The subject matter described in this specification can be implemented in particular embodiments so as to realize one or more of the following advantages.

The described image generation system can generate an image with high resolution that depicts a scene described by a text prompt. That is, the image generation system can effectively generate a high resolution image that is accurately captioned by the text prompt. By making use of a sequence (or "cascade") of generative neural networks (GNNs) that can each be conditioned on the text prompt, the system can iteratively up-scale the resolution of the image, ensuring that a high resolution image can be generated without requiring a single neural network to generate the image at the desired output resolution directly. Cascading GNNs in this manner can significantly improve their sample quality, as well as compensate for any artifacts generated at lower resolutions, e.g., distortions, checkerboard artifacts, etc.

Owing to the modular nature of the system, this iterative up-scaling procedure can be used to generate high-fidelity images at any desired resolution. The system can utilize any suitable number of GNNs each implementing any suitable type of generative model and each having any suitable number of neural network layers, network parameters, and/or hyperparameters to generate an image at the desired resolution. Besides the performance improvements at inference, the modularity of the system also realizes significant gains during training. For example, a training engine can jointly train the sequence of GNNs in parallel which facilitates a high degree of optimization and reduction in training times. That is, each GNN in the sequence can be independently optimized by the training engine to impart certain properties to the GNN, e.g., particular output resolutions, fidelity, perceptual quality, efficient decoding (or denoising), fast sampling, reduced artifacts, etc.

To provide high fidelity text-to-image synthesis with a high degree of text-image alignment, the system can use a pre-trained text encoder neural network to process a text prompt and generate a set (or sequence) of contextual embeddings of the text prompt. The text prompt can describe a scene (e.g., as a sequence of text tokens in a natural language) and the contextual embeddings can represent the scene in a computationally amendable form (e.g., as a set or vector of numeric values, alphanumeric values, symbols, or other encoded representation). The training engine can also hold the text encoder frozen when the sequence of GNNs is trained to improve alignment between text prompts and images generated at inference. A frozen text encoder can be particularly effective because it can enable the sequence of GNNs to learn deep language encodings of scenes that may otherwise be infeasible if the text encoder were trained in parallel, e.g., due to the text encoder being biased on the particular scenes described by text-image training pairs. Furthermore, text-based training sets are generally more plentiful and sophisticated than currently available text-image training sets which allows the text encoder to be pre-trained and thereafter implemented in a highly optimized fashion. See, for example, T5 text encoders provided by Colin Raffel et al., "Exploring the Limits of Transfer Learning with a Unified Text-to-Text Transformer. *JMLR*, 21(140), 2020." Freezing the text encoder has several other advantages such as offline computation of contextual embeddings, resulting in negligible computation or memory footprint during training. In some implementations, the training engine fine-tunes the pre-trained text encoder after the sequence of GNNs is trained which, in some cases, can enable even better text-image alignment.

The system can process the contextual embeddings using the sequence of GNNs to generate a final output image depicting the scene that is described by the text prompt. In particular, an initial GNN can receive the contextual embeddings of the text prompt. The initial GNN can process the contextual embeddings to generate an initial output image having an initial resolution. For example, the initial output image can be generated by the initial GNN at a relatively low resolution (e.g., 64×64 pixels). The initial output image can be iteratively processed by each subsequent GNN in the sequence to generate respective output images with increasing resolution until the final output image, having a desired final resolution, is obtained. For example, the final output image can be generated by a final GNN in the sequence at relatively high resolution (e.g., 1024×1024 pixels). More particularly, each subsequent GNN can receive a respective input that includes the contextual embeddings and a respective input image, which was generated as output by a preceding GNN in the sequence, and process the respective input to generate a respective output image having a higher resolution than the respective input image. For instance, the system can use a base image generation model for the initial GNN and super-resolution models for the subsequent GNNs to increase the resolution of output images relative to input images. In some cases, a subsequent GNN may apply noise conditioning augmentation to its input image which slightly corrupts the input image. This can allow the subsequent GNN to correct for errors and/or artifacts the preceding GNN may have generated. The system can also provide a signal to the subsequent GNN that specifies the magnitude of the conditioning augmentation applied to its input image.

Each GNN in the sequence of GNNs can have any appropriate neural network architecture that enables it to perform its described function, i.e., processing a set of contextual embeddings of a text prompt and/or a respective input image to generate a respective output image. In particular, a GNN can include any appropriate types of neural network layers (e.g., fully-connected layers, convolutional layers, self-attention layers, etc.) in any appropriate numbers (e.g., 5 layers, 25 layers, or 100 layers) and connected in any appropriate configuration (e.g., as a linear sequence of layers).

In some implementations, the image generation system uses diffusion-based models for each of the GNNs, although any combination of generative models can be utilized by the system, e.g., variational auto-encoders (VAEs), generative adversarial networks (GANs), etc. Diffusion models can be particularly effective in the modular setting of the system due to their controllability and scalability. For example, compared to some generative models, diffusion models can be efficiently trained by the training engine on computationally tractable objective functions with respect to a given training dataset. These objective functions can be straightforwardly optimized by the training engine to increase the speed and performance of diffusion-based GNNs (DBGNNs), as well as enable techniques such as classifier-free guidance and progressive distillation which further improve performance.

Among other aspects, this specification describes a methodology to scale up an image generation system as a high resolution text-to-image model. For DBGNNs, v-parametrizations can be implemented by the system for stability and to facilitate progressive distillation in combination with classifier-free guidance for fast, high quality sampling. The image generation system is not only capable of generating images with high fidelity, but also has a high degree of controllability and world knowledge, including the ability to generate diverse images and text in various artistic styles.

The image generation system described in this specification can be implemented in any appropriate location, e.g., on a user device (e.g., a mobile device), or on one or more computers in a data center, etc. The modularity of the image generation system allows multiple devices to implement individual components of the system separately from one another. Particularly, different GNNs in the sequence can be executed on different devices and can transmit their outputs and/or inputs to one another (e.g., via telecommunications). As one example, the text encoder and a subset of the GNNs may be implemented on a client device (e.g., a mobile device) and the remainder of the GNNs may be implemented on a remote device (e.g., in a data center). The client device can receive an input (e.g., a text prompt) and process the text prompt using the text encoder and the subset of GNNs to generate an output image with a particular resolution. The client device can then transmit its outputs (e.g., the output image and a set of contextual embeddings of the text prompt) which is received at the remote device as input. The remote device can then process the input using the remainder of the GNNs to generate a final output image having a higher resolution than the received image.

Users can interact with the image generation system, e.g., by providing inputs to the image generation system by way of an interface, e.g., a graphical user interface, or an application programming interface (API). In particular, a user can provide an input that includes: (i) a request to generate an image, and (ii) a prompt (e.g., a text prompt) describing the contents of the image to be generated. In response to receiving the input, the image generation system can generate an image responsive to the request, and provide the image to the user, e.g., for display on a user device of the user, or for storage in a data storage device. In some cases, the image generation system can transmit a generated image to a user device of the user, e.g., by way of a data communication network (e.g., the internet).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

FIG. 7 shows various images generated from text prompts by an image generation system.

Like reference numbers and designations in the various drawings indicate like elements.

DETAILED DESCRIPTION

Figure 1A:
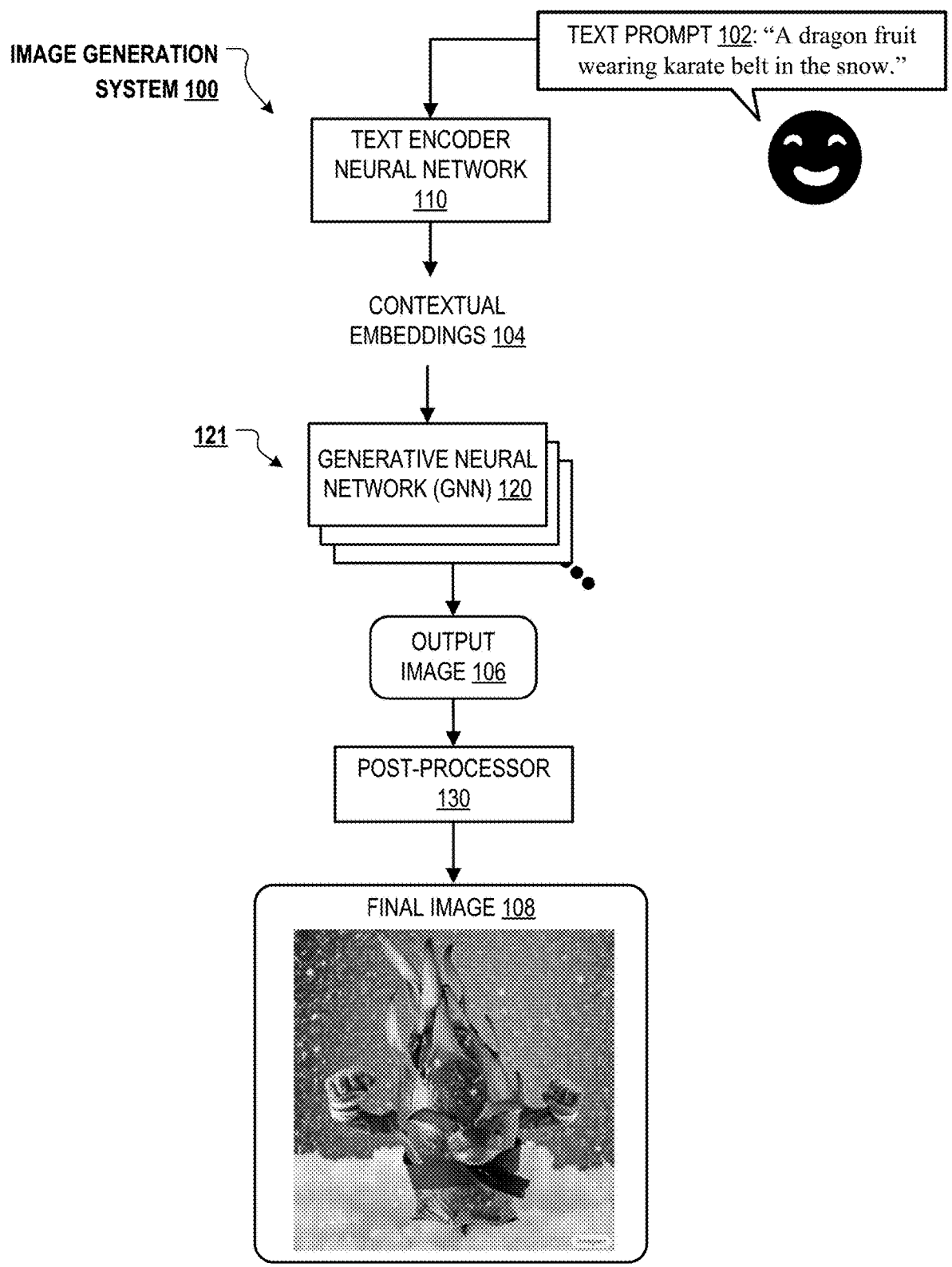
FIG. 1A shows a block diagram of an example image generation system that can generate images from text prompts.

This specification introduces an image generation system that combines the power of text encoder neural networks (e.g., large language models (LLMs)) with a sequence of generative neural networks (e.g., diffusion-based models) to deliver text-to-image generation with a high degree of photorealism, fidelity, and deep language understanding. In contrast to prior work that use primarily image-text data for model training, a contribution described in this specification is that contextual embeddings from text encoders, pre-trained on text-only corpora, are effective for text-to-image generation.

Examples of the image generation system also demonstrate a number of advantages and insights related to generative image modeling and generative modeling as a whole, including, but not limited to:

1. The effectiveness of a sequence or "cascade" of generative neural networks (e.g., diffusion-based models) for high resolution image generation.
2. The effectiveness of frozen encoder text conditioning and classifier-free guidance in diffusion-based models.
3. The effectiveness of a new diffusion-based sampling technique, referred to as dynamic thresholding, for generating photorealistic and detailed images.
4. Additional design choices such as v-prediction parameterizations and progressive distillation for guided diffusion models.
5. Several neural network architecture choices including a new architecture, referred to as Efficient U-Net, which has fast convergence and is memory efficient.

As is described below, the image generation system uses a sequence of generative neural networks (GNNs) to progressively increase the resolution of an image that depicts a scene described by a text prompt. In this way, the system can generate images that closely match the distribution of natural and/or other images. For example, the sequence of GNNs can model a joint distribution over images at multiple resolutions and conditioned on the text prompt (or other conditioning inputs), that is based on the distribution of images in a training set used to train the sequence of GNNs (described in more detail below).

As used herein, the term "scene" generally refers to any collection of one or more objects or generic "things" that may or may not be interacting in some way. For example, a scene may include multiple objects interacting with one another in an environment, e.g., "A strawberry splashing in the coffee in a mug under the starry sky", or "A brain riding a rocketship heading towards the moon", or "A strawberry mug filled with white sesame seeds. The mug is floating in a dark chocolate sea". A scene may include a single object without a background or backdrop, or with a single color background or backdrop, e.g., "Studio shot of minimal kinetic sculpture made from thin wire shaped like a bird on white background". A scene may include text or abstract art such as colors, shapes, lines, and so on, e.g., "A blue flame forming the text 'Imagen'". As shown in FIG. 7 the types of scenes that can be depicted in images and described by text prompts is diverse and can span from real-world settings to abstract. Note, a text prompt may not explicitly describe all objects in a scene. For example, the text prompt can describe a mood that the scene should evoke, e.g., "happiness is a sunny day", or "fear of the unknown". In general, text prompts can include any text, whether it is descriptive of visual attributes or not.

When referring to an image, the term "resolution" is the spatial resolution of the image and generally refers to how close lines in the image can be to each other while still being visibly resolvable. That is, how close two lines can be to each other without them appearing as a single line in the image. In some implementations, the resolution can be identified with the pixel resolution which, in this case, corresponds to the number of independent pixels per unit length (or per unit area) for an image—not necessarily the total number of pixels per unit length (or per unit area) for the image. In particular, a first image can have a higher pixel count than a second image but is still of worse resolution than the second image. For example, naively upsampling the pixels of an image increases the pixel count but does not increase the resolution. Generally, a relative length scale is also assumed to have a definite comparison of resolution between images. For example, a digital image with 2048× 1536 independent pixels may appear as low resolution (~72 pixels per inch (ppi)) if viewed at 28.5 inches wide, but may appear as high resolution (~300 ppi) if viewed at 7 inches wide. The relative length scale generally refers to the length scale at which an image is viewed (e.g., on a display), not necessarily the length scale of a scene depicted in the image. For example, an image depicting planetary motion and an image depicting atomic motion can have different length scales in their respective scenes but the same relative length scale when viewed.

FIG. 1A shows a block diagram of an example image generation system 100. The image generation system 100 is an example of a system implemented as computer programs on one or more computers in one or more locations in which the systems, components, and techniques described below are implemented.

At a high-level, the image generation system 100 includes a text encoder neural network 110, a sequence of generative neural networks (GNNs) 121 and, in some implementations, a post-processor 130. The system 100 is configured to receive text prompts 102 as input and to generate final images 108 as output.

More particularly, the system 100 can receive a text prompt ($\mathcal{T}$) 102 describing a scene. The text prompt 102 can be a text sequence that includes multiple text tokens $\mathcal{T}_{1, 2, \ldots}$ in a natural language $\mathcal{T} = (\mathcal{T}_1, \mathcal{T}_2, \ldots)$. For example, as shown in FIG. 1A, the text prompt 102 can include: "A dragon fruit wearing karate belt in the snow." In general, the text prompt 102 can describe any particular scene and the system 100, when appropriately trained (e.g., by a training engine), is capable of generating high resolution images that faithfully depict the scene. The text prompt 102 may also include text modifiers such as "Smooth", "Studio lighting", "Pixel art", "in the style of Van Gough", etc. that impart various styles, modifications, and/or characteristics on final images 108 generated by the system 100. Moreover, the system 100 can generate various different types of images such as three-dimensional (3D) images, photorealistic images, cartoon images, abstract visualizations, point cloud images, medical images of different modalities, among others. For example, the system 100 can generate medical images including, but limited to, magnetic resonance imaging (MM) images, computed tomography (CT) images, ultrasound images, x-ray images, and so on.

The text encoder 110 is configured to process the text prompt 102 to generate a set of contextual embeddings (u) of the text prompt 102. In some implementations, the text encoder 110 is a pre-trained natural language text encoder, e.g., a T5 text encoder such as T5-XXL, a CLIP text encoder, a large language model (LLM), among others. For example, the text encoder 110 can be a self-attention encoder such as a transformer model, e.g., that includes self-attention layers followed by perceptron layers. The contextual embeddings 104 can also be referred to as an encoded representation of the text prompt 102 that provides a computationally amenable representation for processing by the system 100. For example, the contextual embeddings 104 can be a set, vector, or array of values (e.g., in UNICODE or Base64 encoding), alphanumeric values, symbols, or any convenient encoding.

The sequence of GNNs 121 includes multiple GNNs 120 that are each configured to receive a respective input (c). Each GNN 120 is configured to process their respective input to generate a respective output image ($\hat{x}$). In general, the sequence 121 includes an initial GNN that generates an initial output image (e.g., at low resolution) and one or more subsequent GNNs that progressively increase the resolution of the initial output image. For example, each subsequent GNN can include a super-resolution model to increase the resolution. Accordingly, the respective input for the initial GNN includes the contextual embeddings 104, while the respective input for each subsequent GNN includes the output image generated by a preceding GNN in the sequence 121. In some cases, the respective input to each subsequent GNN may include one or more output images generated at lower depth in the sequence 121, as opposed to only the immediately preceding GNN. Such cases can also be realized using the techniques outlined herein. In some implementations, the respective input for one or more of the subsequent GNNs also includes the contextual embeddings 104 which allows a subsequent GNN to condition on the text prompt 102. In further implementations, the respective input for each subsequent GNN includes the contextual embeddings 104 which can, in some cases, improve performance of the system 100, e.g., such that each subsequent GNN generates a respective output image that is strongly conditioned on the text prompt 102. In some cases, the respect input to one or more of the subsequent GNNs can include a different conditioning signal such as a set of contextual embeddings of a different text prompt. In these cases, a subsequent GNN can change its input image to a different type of output image based on the different text prompt and/or generate an output image that is a hybridization between the text prompts. For example, the initial GNN may receive a set of contextual embeddings associated with the text prompt "photograph of cat" and one or more of the subsequent GNNs may receive a set of contextual embeddings associated with the text prompt "oil painting of cat". Such cases can also be realized using the techniques outlined herein, e.g., in implementations involving noise conditioning augmentation which is described in more detail below.

The system 100 processes the contextual embeddings 104 through the sequence 121 to generate an output image 106 at a high resolution, with few (if any) artifacts. The output image 106 is usually a final output image, i.e., the respective output image of a final GNN in the sequence 121, but can, more generally, be provided by any GNN 120 in the sequence 121.

In some implementations, the output image 106 is further processed by the post-processor 130 to generate a final image (x) 108. For example, the post-processor 130 can perform transformations on the output image 106 such as image enhancement, motion blur, filtering, luminance, lens flare, brightening, sharpening, contrast, among other image effects. Some or all of the transformations performed by the post-processor 130 may also be performed by the sequence 121 when the GNNs 120 are suitably trained (e.g., by a training engine). For example, the GNNs 120 can learn these transformations and associate them with respective text modifiers included in text prompts 102. In some implementations, the system 100 does not include the post-processor 130 and the output image 106 generated by the sequence 121 is the final image 108. Alternatively, system 100 can disable the post-processor 130 such that transformations performed on the output image 106 by the post-processor 130 are equivalent to the identity operation.

In some implementations, the post-processor 130 may perform analysis on the output image 106 such as image classification and/or image quality analysis. The post-processor 130 may include one or more neural networks such as a convolutional neural network (CNN), a recurrent neural network (RNN), and/or an image encoder to perform such classification and/or analysis. For example, the post-processor 130 can determine if the output image 106 accurately depicts the scene described by the text prompt 102 by encoding the output image 106 into a set of visual embeddings and comparing it with the contextual embeddings 104. In these cases, the post-processor 130 may include an image encoder that is paired with the text encoder 110, such as pre-trained text-image encoder pair, e.g., a CLIP text-image encoder pair. This also presents a means of zero-shot (or semi-supervised) training of the sequence 121 by comparing visual embeddings with contextual embeddings 104. In other words, the sequence 121 may be trained (e.g., by a training engine) to generate output images 106 from text-based training sets (as opposed to only labelled text-image training sets) by generating output images 106 that faithfully reconstruct contextual embeddings 104 once encoded into visual embeddings. As another example, the post-processor 130 can determine if the output image 106 has high resolution, spatial coherence, few artifacts, etc. using a CNN and/or a RNN, as well as using objective image quality analysis (IQA).

The final image 108 depicts the scene described by the text prompt 102 and is output by the system 100 with a final resolution $\mathcal{R}$. For example, as shown in FIG. 1A, the final image 108 depicts a dragon fruit wearing a karate belt in the snow. Accordingly, the final image 108 is accurately captioned by the corresponding text prompt 102 in FIG. 1A. FIG. 7 shows other examples of images that can be generated from text prompts by the image generation system 100.

The final resolution $\mathcal{R}$ is a measure of the information content of the image 108, i.e., the dimensionality of the image 108. As mentioned above, resolution can correspond to a pixel resolution, i.e., a number of independent pixels. $\mathcal{R} = \mathcal{N}_x \times \mathcal{N}_y$ over pre-defined lengths (or a pre-defined area). Hence, an image can include an $\mathcal{N}_x \times \mathcal{N}_y$ sized array of pixel values (e.g., corresponding to RGB or CMYK color channels) in a particular range, e.g., pixel values between [−1, 1], with more (independent) pixels providing higher resolution. In most cases, the final resolution $\mathcal{R}$ of the final image 108 is equal to the resolution R of the output image 106, but these may differ in some implementations, e.g., if the post-processor 130 resizes the output image 106.

For reference, the example images depicted in FIG. 1A and FIG. 7 were generated at a resolution of 1024×1024 pixels. The example images were generated by an image generation system implementing a sequence of three diffusion-based GNNs (DBGNNs) that includes an initial DBGNN employing a base image generation model and two subsequent DBGNNs employing super-resolution models. The initial DBGNN generates an initial output image at an initial resolution of 64×64 and the two subsequent DBGNNs successively increase the resolution by factors 4×4 such that the first subsequent DBGNN implements 64×64→256×256 and the second subsequent DBGNN implements 256× 256→1024×1024. The initial DBGNN has 2 billion parameters, the first subsequent DBGNN has 600 million parameters, and the second subsequent DBGNN has 400 million parameters for a combined total of 3 billion neural network parameters.

Figure 1B:
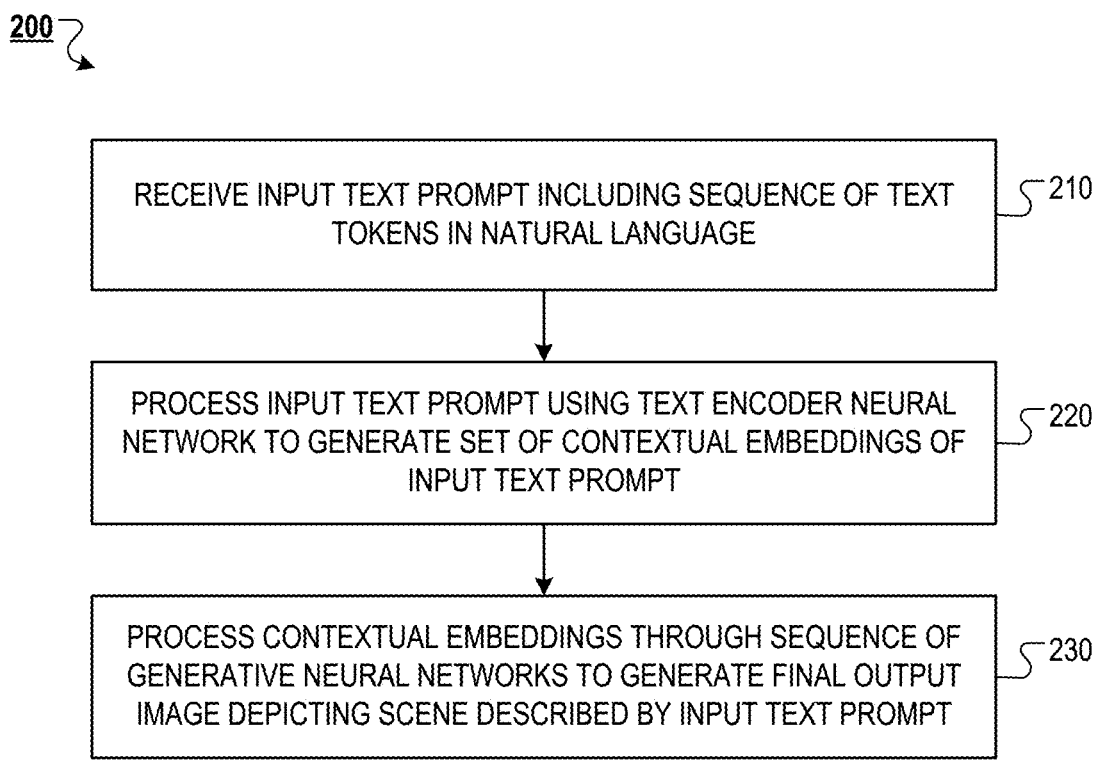
FIG. 1B is a flow diagram of an example process for generating an image from a text prompt.

FIG. 1B is a flow diagram of an example process 200 for generating a final image depicting a scene that is described by a text prompt. For convenience, the process 200 will be described as being performed by a system of one or more computers located in one or more locations. For example, an image generation system, e.g., the image generation system 100 of FIG. 1A, appropriately programmed in accordance with this specification, can perform the process 200.

The system receives an input text prompt including a sequence of text tokens in a natural language (210).

The system processes the input text prompt using a text encoder neural network to generate a set of contextual embeddings of the input text prompt (220).

The system processes the contextual embeddings through a sequence of generative neural networks to generate a final output image that depicts a scene that is described by the input text prompt (230).

In general, the sequence 121 can utilize any of multiple types of generative models for the GNNs 120. Such generative models include, but are not limited to, diffusion-based models, generative adversarial networks (GANs), variational auto-encoders (VAEs), auto-regressive models, energy-based models, Bayesian networks, flow-based models, hierarchal versions of any of these models (e.g., continuous or discrete time), among others.

Broadly speaking, the goal of the sequence 121 is to generate new instances of high resolution images with a high degree of controllability, i.e., that are strongly conditioned on a conditioning input (e.g., text prompts). As explained above, each GNN 120 in the sequence 121 processes a respective conditioning input c to generate a respective output image $\hat{x}$, where the respective input c includes a set of contextual embeddings (u) of a text prompt and/or an output image generated by a preceding GNN in the sequence 121. That being said, the contextual embeddings can also be substituted with a different conditioning input such as a noise input, a pre-existing image, a video, an audio waveform, embeddings of any of these, combinations thereof, etc. Although this specification is generally concerned with text-to-image generation, the image generation systems disclosed herein are not limited to such. The image generation systems can be applied to any conditioned image generation problem by changing the conditioning input into the sequence 121. An example of such an implementation is described with respect FIGS. 6A-6C which shows an example image generation system 101 generating images from noise.

In the context of the sequence 121, the ability to generate conditioned images at multiple resolutions can be advantageous as it allows the sequence 121 to learn at multiple different spatial scales, while keeping each individual GNN relatively simple. This can be significant with respect to maintaining spatial coherence in output images since features at different length scales can be captured at different stages in the sequence 121. For example, the joint distribution of a sequence 121 including an (i=0) initial GNN and (i=1,2, . . . , n) subsequent GNNs can be expressed as a Markovian chain:

$$p_\theta(x^{(n)}, x^{(n-1)}, x^{(n-2)}, \ldots, x^{(0)} | u) =$$

$$p_\theta(x^{(n)} | x^{(n-1)}, u) p_\theta(x^{(n-1)} | x^{(n-2)}, u) \ldots p_\theta(x^{(0)} | u) =$$

$$p_\theta(x^{(n)} | c^{(n)}) p_\theta(x^{(n-1)} | c^{(n-1)}) \ldots p_\theta(x^{(0)} | c^{(0)}) = \prod_{i=0}^{n} p_\theta(x^{(i)} | c^{(i)})$$

where $x^{(i)}$ corresponds to images of a particular resolution $R^{(i)}$, with $R^{(i)} > R^{(i-1)}$, and $p_\theta(x^{(i)}|c^{(i)})$ is the respective likelihood distribution of a particular GNN 120 conditioned on $c^{(i)} = (x^{(i-1)}, u)$. Compare this with a single GNN generating images directly to the highest resolution $p_\theta(x^{(n)}|u)$. The amount of data that a single GNN learns from can be orders of magnitude smaller than a sequence of GNNs 121. Moreover, the sequence 121 allows data associated with each resolution to be learned in parallel. For brevity, the superscript (i) identifying a particular GNN 120 is dropped unless otherwise pertinent.

To generate strongly conditioned output images, a GNN 120 can parametrize its likelihood distribution $p_\theta(x|c)$ as one that maximizes the conditional probability of corresponding pairs (x,c) of data, e.g., data derived from one or more text-image training sets. In other words, the GNN 120 can implement a parametrization that maximizes the probability of a ground truth output image x given a corresponding training input c, or at least optimizes some objective function $L_\theta(x,c)$ that depends on the training data (x,c). Here, $\theta$ is the respective set of network parameters of the GNN 120 that dictates the functional form of the likelihood distribution. For clarity, output images actually generated by a GNN 120 have a hat symbol $\hat{x}$ which denotes that images x are "estimated" by $\hat{x}$. As is described in more detail below, a GNN 120 can generate estimates $\hat{x}$ in a variety of ways depending on the implementation.

A GNN 120 facilitates a likelihood parametrization by modelling intermediate distributions over latent representations z of images x, a.k.a., embeddings, encodings, or "labels" of images. For example, the latents z can be used by the GNN 120 to generate particular types of images as identified by particular conditioning inputs c. The latent spaces can also provide the GNNs 120 a means of combining, mixing, and compressing information from different images such that the sequence 121 can generate new instances of images that are ostensibly unlike anything appearing in the training sets.

First consider moving to the latent space. To with, marginalizing the likelihood $p_\theta(x|c)$ over the latent representations z provides the integral relation:

$$p_\theta(x|c) = \int p_\theta(x, z|c) dz$$

$p_\theta(x,z|c)$ is the joint distribution of x and z conditioned on c. In most cases, the dimension of the latent representations z is less than or equal to the dimension of the corresponding images x, i.e., the resolution R of the images, which enables a compressed representation of the images. Using the chain-rule, the joint distribution can be expressed as:

$$p_\theta(x,z|c) = p_\theta(x|z,c) p_\theta(z|c)$$

$p_\theta(z|c)$ is the prior distribution of z given c, while $p_\theta(x|z,c)$ is the conditional distribution of x given z and c. The conditional distribution allows a GNN 120 to invert images x given their latent representations z, while the prior distribution allows a GNN 120 to realize a generative model of the latent representations themselves. Modelling the prior distribution can be advantageous, for example, when a GNN 120 seeks to correlate conditioning inputs c strongly with latent representations z, such that $p_\theta(z|c)$ is highly localized around c. A GNN 120 can model various different prior distributions such as autoregressive priors, diffusion priors, normal distributions, among others.

Accordingly, to generate an output image $\hat{x}$, a GNN 120 can process a conditioning input c and sample a latent from the prior distribution $z \sim p_\theta(z|c)$. The GNN 120 can then process the latent z to generate the output image $\hat{x}$ from the conditional distribution $p_\theta(x|z,c)$, which is generally associated with the image types as specified by c. The GNN 120 can generate the output image $\hat{x}$ from the conditional distribution in many different ways. For example, the GNN 120 can sample an image from the conditional distribution:

$$\hat{x} \sim p_\theta(x|z,c),$$

return the mean of the conditional distribution:

$$\hat{x} = \mathbb{E}_{x \sim p_\theta(x|z,c)}[x] = \int x p_\theta(x|z,c) dx,$$

return the image with the highest probability:

$$\hat{x} = \operatorname*{argmax}_x p_\theta(x|z,c),$$

use an algorithm to choose from multiple high-probability images and/or multiple samples of images, and so on. Since an output image $\hat{x} = \hat{x}(\theta,z,c)$ is generally a function of the network parameters $\theta$, the sampled latent z, and the conditioning input c, a GNN 120 is capable of generating new instances of images that are strongly correlated with c. Particularly, the GNN 120 can implement a parametrization $\theta$ that efficiently decodes randomly sampled latents z into images x based on the input c. Hence, the image generation process at each stage of the sequence 121 can be understood as a conditioned decoding process.

In some implementations, a GNN 120 may model the prior distribution as a standard normal distribution $p_\theta(z|c) = p(z) = \mathcal{N}(z;0,I)$ and the conditional distribution as a normal distribution $p_\theta(x|z,c) = \mathcal{N}(x;\mu_\theta(z,c), \sigma_\theta^2(z,c)I)$, where $\mu_\theta(z,c)$ and $\sigma_\theta^2(z,c)$ are the mean and variance, respectively, as a function of z and c. In this case, the GNN 120 can generate the mean and/or variance of the conditional distribution as output and then determine an output image $\hat{x}$ from the mean and/or variance. This can facilitate straightforward neural network architectures (e.g., super-resolution models) since the GNN 120 can generate $\hat{x}$ deterministically from z and c, without modelling the prior distribution or directly referencing the conditional distribution. Moreover, this parametrization enables optimization of stochastic terms (e.g., via gradient descent methods) that would otherwise be non-differentiable. For example, after using the re-parametrization trick, a sample from the conditional distribution is equivalent to $\hat{x} = \mu_\theta(z,c) + \sigma_\theta(z,c) \odot \epsilon$, where $\epsilon \sim \mathcal{N}(0,I)$ and $\odot$ represents the element-wise product. As another example, returning the mean of the conditional distribution amounts to $\hat{x} = \mu_\theta(z,c)$. Hence, the GNN 120 can be realized, at least in part, as a neural network that takes z and c as input and generates $\mu_\theta(z,c)$ and/or $\sigma_\theta(z,c)$ as output.

The particular form of the conditional and prior distributions generally depends on the generative model implemented by a particular GNN 120 as well as its assumptions, architecture, parametrization and training regime. For example, the type of objective functions $L_\theta(x,c)$, the type and amount of training sets, and the statistics of the training sets can affect the convergence of a particular model. In any case, a training engine can use an expectation-maximization (EM) algorithm to maximize the likelihood $p_\theta(x|c)$ of a GNN 120 with respect to its network parameters $\theta$ to determine the conditional and/or prior distributions.

That being said, EM algorithms and certain objective functions $L_\theta(x,c)$ can be computationally intractable in some cases, e.g., when the training engine uses considerably large training sets, the prior and/or conditional distributions are particularly complex, etc. In these cases, the training engine can simultaneously model posterior distributions $q_\phi(z|x,c)$ over the latent representations which can speed up the calculus during training, e.g., when the training engine maximizes the evidence lower bound (ELBO). The posterior distribution describes how data (x,c) is encoded into latent representations z. Here, $\phi$ is another set of network parameters that can be included in a respective GNN 120 or another neural network, e.g., a discriminative neural network (DNN). A GNN 120 can sample from the posterior distribution instead of the prior distribution during training, which can significantly reduce the number of latents z needed to converge to a suitable parameterization $\theta$, e.g., when the training engine simultaneously optimizes an objective function $L_{\theta,\phi}(x,c)$ with respect to $\theta$ and $\phi$. After training, the GNN 120 can continue sampling from the prior distribution. In some implementations, the training engine can model the posterior distribution as a normal distribution $q_\phi(z|x,c) = \mathcal{N}(z;\mu_\phi(x,c),\sigma_\phi^2(x,c)I)$, where $\mu_\phi(x,c)$ and $\sigma_\phi^2(x,c)$ are the mean and variance, respectively, as a function of x and c. As mentioned above with respect to the conditional distribution, a parametrization of this form can aid in optimizing stochastic terms (e.g., via gradient descent methods) that would otherwise be non-differentiable. For reference, the conditional distribution $p_\theta(x|z,c)$ in combination with the posterior distribution $q_\phi(z|x,c)$ is usually referred to as a variational auto-encoder (VAE), with $\theta$ being the decoder parameters and $\phi$ being the encoder parameters.

In some implementations, the GNNs 120 use noise conditioning augmentation during image generation and/or training. In particular, each subsequent GNN in the sequence 121 can apply noise conditioning augmentation to their respective input image which corrupts the image to a certain degree. This can help facilitate parallel training of different GNNs 120 in the sequence 121, as it reduces the sensitivity to domain gaps (e.g., due to artifacts) between the output image of one stage of the sequence 121 and the inputs used in training the subsequent stage. For example, a GNN 120 can apply Gaussian noise augmentation (e.g., Gaussian noise and/or blur) with a random signal-to-noise ratio to its input image during training. At interference time, the GNN 120 can use a fixed signal-to-noise ratio (e.g., about 3 to 5), representing a small amount of augmentation, which aids in removing artifacts in the output image from the previous stage while preserving most of the structure. Alternatively, the GNN 120 can sweep over different values of the signal-to-noise ratio at inference to determine the highest quality estimate.

Examples of diffusion-based GNNs (DBGNNs) 120 are described below that can generate strongly conditioned output images from latent representations. Diffusion models generally come in two flavors: (i) discrete time hierarchies, and (ii) continuous time hierarchies. Either approach can be implemented by the GNNs 120. However, continuous time diffusion models may lead to less error than discrete time versions. For example, continuous time diffusion models can, in some cases, have an improved evidence lower bound (ELBO) over discrete time versions.

In continuous time, the latent representations are parametrized by a continuous time index $z = \{z_t | t \in [0,1]\}$. The forward (encoding) process is described by the posterior distribution $q_\phi(z|x,c)$ which starts with data (x,c) at t=0 and ends with standard Gaussian noise at t=1. The posterior distribution can be expressed as:

$$q_\phi(z|x,c) = q(z|x) = q(z_s, z_t|x) = q(z_t|z_s)q(z_s|x)$$

$0 \leq s < t \leq 1$ is a truncated continuous time interval. $q(z_t|x)$ is the (forward) prior distribution of $z_t$ given x which describes how a DBGNN 120 encodes images into latent representations. $q(z_t|z_s)$ is the forward transition distribution from $z_s$ to $z_t$ which describes how a DBGNN 120 determines a new latent $z_t$ from $z_s$ for times t>s. For a DBGNN 120, the forward distributions are typically assumed independent of $\phi$ and c. In other words, the forward (encoding) process is usually not learned by the DBGNN 120 and can be described in terms of linear Gaussians:

$$q(z_t|x) = \mathcal{T}(z_t; \alpha_t x, \sigma_t^2 I), q(z_t|z_s) = \mathcal{T}(z_t; (\alpha_t/\alpha_s)z_s, \sigma_{t|s}^2 I)$$

$\sigma_{t|s}^2 = [1 - \exp(\lambda_t - \lambda_s)]\sigma_t^2$ is the variance of the forward transition distribution. The parameters $\alpha_t$ and $\sigma_t$ specify a noise schedule whose log signal-to-noise ratio $\lambda_t = \log(\alpha_t^2/\sigma_t^2)$ decreases monotonically with t until the forward prior distribution converges to a standard normal distribution $q(z_1|x) = q(z_1) = \mathcal{N}(z_1; 0, I)$ at a time of t=1. Any noise schedule can be implemented by a DBGNN 120, such as linear, polynomial, or cosine noise scheduling, among others.

In some implementations, the DBGNNs 120 use cosine noise scheduling (e.g., with $\alpha_t = \cos(0.5\pi t)$) which can be particularly effective at producing high quality samples. A discussion on different noise schedules is provided by Alexander Quinn Nichol and Prafulla Dhariwal, "Improved denoising diffusion probabilistic models," *International Conference on Machine Learning*, PMLR, 2021. In other implementations, the DBGNNs 120 can learn a noise schedule as opposed to assuming one, e.g., by parametrizing the variance $\sigma_t^2 = \sigma_\phi^2(t, c)$. In this implementation the forward process is a learned model. The DBGNNs 120 may also utilize a variance preserving noise schedule $\sigma_t^2 = 1 - \alpha_t^2$ such that the variance of the latents remain at a similar scale over all t.

A DBGNN 120 learns the generative model by matching the forward process in the reverse time direction, generating $z_t$ starting from t=1 and ending at t=0. Learning the generative model can be reduced to learning to denoise $z_t \sim q(z_t|x)$ into an estimate $\hat{x}_\theta(z_t,c) \approx x$ for all t. After using the reparametrization trick on $z_t = \alpha_t x + \sigma_t \epsilon$, this learned denoising can be represented by an objective function $L_\theta(x,c)$ of the form:

$$L_\theta(x,c) = \mathbb{E}_{\epsilon,t}[W_t \|\hat{x}_\theta(\alpha_t x + \sigma_t \epsilon, c) - x\|_2^2]$$

Here, (x,c) are image-input data pairs with $\epsilon \sim \mathcal{N}(0, I)$ sampled from a standard normal distribution and $t \sim U(0,1)$ sampled from a uniform distribution over 0 and 1. $W_t$ is a weighting factor that can be used by a DBGNN 120 to influence the quality of estimates for particular values of t. A DBGNN 120 can realize a parametrization that minimizes the objective function $$\theta = \arg\min_\theta L_\theta(x, c)$$

which generally maximizes the ELBO and therefore the likelihood $p_\theta(x|c)$. Alternatively, the DBGNN 120 can realize a parametrization that minimizes the objective function averaged over all training pairs $$\theta = \arg\min_\theta \mathbb{E}_{(x,c)}[L_\theta(x, c)].$$

The averaged objective function can improve the quality of estimates but at the cost of likelihood. Note, in some implementations, the DBGNN 120 may utilize variations of this objective function and/or incorporate additional loss terms in the objective function, e.g., if the forward process is learned, to emphasize certain features of the training data, emphasize particular examples from the training data, etc. For example, the objective function can alternatively, or in addition, include a $L_1$ loss where the squared norm is $\| \ldots \|_2^2$ is replaced with the absolute norm $\| \ldots \|_2$. The objective function can also include other suitable norms as loss terms that characterize an error between $\hat{x}_\theta(z_t,c)$ and x, such as p-norms, composite norms that weight certain pixels, etc.

After learning a suitable parametrization $\theta$, a DBGNN 120 can then generate output images $\hat{x}$ from latent representations based on conditioning inputs c. The reverse (decoding) process is described by the joint distribution $p_\theta(x,z|c)$ which starts with standard Gaussian noise at t=1 and ends with an output image $\hat{x}$ conditioned on c at t=0. Noting that s<t, the joint distribution can be expressed as:

$$p_\theta(x,z|c) = p_\theta(x,z_s,z_t|c) = p_\theta(x|z_s,c)p_\theta(z_s|z_t,c)p_\theta(z_t|c)$$

$p_\theta(z_t|c)$ is the (reverse) prior distribution of $z_t$ given c that determines how a DBGNN 120 encodes inputs c into latents $z_t$. Due to the noise schedule, the reverse prior distribution converges to a standard normal distribution $p_\theta(z_1|c) = p(z_1) = \mathcal{N}(z_1; 0, I)$ at a time of t=1 and is therefore unconditioned on c at the start of the reverse process. In a similar vein as the forward process, $p_\theta(z_s|z_t,c)$ is the reverse transition distribution from $z_t$ to $z_s$ given c, while $p_\theta(x|z_t,c)$ is the conditional distribution of x given $z_t$ and c.

The reverse transition distribution can be determined from:

$$p_\theta(z_s|z_t,c) = q(z_s|z_t, x = \hat{x}_\theta(z_t,c))$$

The reverse transition distribution describes how a DBGNN 120 determines a new latent $z_s$ from a given latent $z_t$, conditioned on c, for times s<t. In this case, $q(z_s|z_t,x) = q(z_t|z_s)q(z_s|x)/q(z_t|x)$ is the reversed description of the forward process and can be expressed in terms of a normal distribution of the form:

$$q(z_s|z_t,x) = \mathcal{N}(z_s; \tilde{\mu}_{s|t}(z_t,x), \tilde{\sigma}_{s|t}^2 I)$$

$\tilde{\mu}_{s|t}(z_t,x)$ is the mean of the reversed description as a function of $z_t$ and x, which can be expressed as:

$$\tilde{\mu}_{s|t}(z_t,x) = \exp(\lambda_t - \lambda_s)(\alpha_s/\alpha_t)z_t + [1 - \exp(\lambda_t - \lambda_s)]\alpha_s x$$

$\tilde{\sigma}_{s|t}^2 = [1 - \exp(\lambda_t - \lambda_s)]\sigma_s^2$ is the variance of the reversed description.

The conditional distribution $p_\theta(x|z_t,c)$ describes how a DBGNN 120 decodes latents $z_t$ into images x based on the conditioning input c. After completing the reverse process, the DBGNN 120 may generate an output image $\hat{x}$ from the conditional distribution $p_\theta(x|z_0,c)$ at the final time step t=0. A DBGNN 120 can generate an output image $\hat{x}$ from the conditional distribution in a variety of ways, e.g., sampling from the conditional distribution, returning the mean of the conditional distribution, returning the image with the highest probability, using an algorithm to choose from multiple high-probability images and/or multiple samples of images, and so on. A DBGNN 120 can also model the conditional distribution in a variety of different ways. However, the conditional distribution of a DBGNN 120 is generally not normally distributed which can make modeling and sampling from it difficult. Various sampling methods that can alleviate this problem are described below. Note, in implementations involving noise conditioning augmentation (e.g., during image generation and/or training), the respective input c to each subsequent DBGNN may also include a signal $\lambda'_t = \partial_t \lambda_t$ that controls the strength of the augmentation applied to the subsequent DBGNN's input image.

To sample latents during the reverse process, a DBGNN 120 can use the discrete time ancestral sampler with sampling variances derived from lower and upper bounds on reverse process entropy. Greater detail of the ancestral sampler is provided by Jonathan Ho, Ajay Jain, and Pieter Abbeel, "Denoising Diffusion Probabilistic Models," *NeurIPS*, 2020. Starting at the reverse prior distribution $z_1 \sim \mathcal{N}(z_1; 0, I)$ at t=1 and computing transitions with $p_\theta(z_s|z_t,c)$ for times s<t, the ancestral sampler follows the update rule:

$$z_s = \tilde{\mu}_{s|t}(z_t, \hat{x}_\theta(z_t,c)) + \epsilon \sqrt{(\tilde{\sigma}_{s|t}^2)^{1-\gamma}(\sigma_{t|s}^2)^\gamma}$$

$\epsilon$ is standard Gaussian noise, $\gamma$ is a hyperparameter that controls the stochasticity of the sampler and s, t follow a uniformly spaced sequence from 1 to 0. The update rule allows a DBGNN 120 to generate a new latent $z_s$ from the previous latent $z_t$ and the previous estimate $\hat{x}_\theta(z_t,c)$ until $z_0$ is reached, at which point the estimate $\hat{x}_\theta(z_0,c)$ is generated by the DBGNN 120 as the output image $\hat{x} = \hat{x}_\theta(z_0,c)$. This implementation can be particularly efficient, as the DBGNN 120 can sample standard Gaussian noise and directly generate the estimate $\hat{x}_\theta(z_t,c)$ as output, which it can use to determine $z_s$ and repeat the process at the next step. As explained above, this allows the DBGNN 120 to generate estimates $\hat{x}_\theta(z_t,c)$ deterministically from $z_t$ and c, without referencing the reverse transition and conditional distributions directly, facilitating straightforward neural network architectures (e.g., super-resolution models). Hence, the DBGNN 120 can be realized, at least in part, as a neural network that takes $z_t$ and c as input and generates $\hat{x}_\theta(z_t,c)$ as output.

Alternatively to the ancestral sampler, a DBGNN 120 can use the deterministic denoising diffusion implicit model (DDIM) sampler as described by Earning Song, Chenlin Meng, and Stefano Ermon, "Denoising diffusion implicit models," *arXiv preprint arXiv*:2010.02502 (2020). The DDIM sampler is a numerical integration rule for the probability flow ordinary differential equation (ODE) which describes how a sample from a standard normal distribution can be deterministically transformed into a sample from the image data distribution using the denoising model.

In some implementations, the DBGNNs 120 use a v-prediction parametrization during image generation and/or training. In this case, a DBGNN 120 generates an estimate $\hat{v}$ of the auxiliary parameter $v_t = \alpha_t \epsilon - \sigma_t x$ instead of generating estimates $\hat{x}$ of images x directly. The DBGNN 120 then determines the estimate of an image from the estimate of the auxiliary parameter $\hat{x}_\theta(z_t,c) = \alpha_t z_t - \sigma_t \hat{v}_\theta(z_t,c)$. Estimating v instead of x generally improves numerical stability, as well as supporting computational techniques such as progressive distillation. Progressive distillation is an algorithm that iteratively halves the number of sampling steps over t by distilling a slow teacher diffusion model into a faster student model, which can speed up sampling rates by orders of magnitude. For example, some state-of-the-art samplers can take as many as 8192 sampling steps but can be reduced to as few as 4 or 8 steps when the DBGNNs 120 use progressive distillation. The DDIM sampler can be useful in combination with progressive distillation for fast sampling. Accordingly, the DBGNNs 120 generally use progressive distillation when implementing the v-parametrization. Moreover, for any subsequent DBGNNs that operate at higher resolutions in the sequence 121, the v-parametrization can avoid color shifting artifacts that can affect high resolution diffusion models and it can avoid temporal color shifting that sometimes appears with other parametrizations (e.g., $\epsilon$-parametrizations). A detailed discussion regarding the v-parametrization and progressive distillation for diffusion models is provided by Tim Salimans and Jonathan Ho, "Progressive Distillation for Fast Sampling of Diffusion Models," *ICLR*, 2022. For reference, a weighting factor of $W_t = 1 + \exp(\lambda_t)$ in the abovementioned objective function $L_\theta$ amounts to an equivalent objective for a standard v-parametrization.

In some implementations, the DBGNNs 120 use classifier-free guidance during image generation and/or training. Classifier-free guidance can improve the fidelity of output images $\hat{x}$ with respect to a given condition input c and amounts to adjusting the estimates $\hat{x}_\theta \rightarrow \tilde{x}_\theta$ using:

$$\tilde{x}_\theta(z_t,c) = (1+\omega)\hat{x}_\theta(z_t,c) - \omega \hat{x}_\theta(z_t)$$

$\omega$ is the guidance weight, $\hat{x}_\theta(z_t,c)$ is the estimate of the conditional model and $\hat{x}_\theta(z_t) = \hat{x}_\theta(z_t,c=0)$ is the estimate of an unconditional model. The training engine can jointly train the unconditional model with the conditional model by dropping out the conditioning input c. Particularly, during training, the training engine can periodically (e.g., randomly, according to an algorithm) drop out the conditioning input c=0 to a DBGNN 120 such that the DBGNN 120 is trained unconditionally on ground truth images x for a certain number of training iterations. For example, the training engine may train the DBGNN 120 conditionally on a set of image-input pairs (x,c) and then train the DBGNN 120 unconditionally on the ground truth images x in the set, e.g., by fine-tuning the DBGNN 120 on the ground truth images. Note that the above linear transformation can be equivalently performed in the v-parametrization space as $\tilde{v}_\theta(z_t,c) = (1+\omega)\hat{v}_\theta(z_t,c) - \omega \hat{v}_\theta(z_t)$. For $\omega > 0$ this adjustment has the effect of over-emphasizing the influence of the conditioning input c, which may produce estimates of lower diversity but generally of higher quality compared to the regular conditional model.

Moreover, a large guidance weight (e.g., about 5 or more, about 10 or more, about 15 or more) can improve text-image alignment but may reduce fidelity, e.g., producing saturated, blank, or unnatural looking images. For example, an estimate $\hat{x}_\theta(z_t,c)$ at a particular sampling step t may be generated outside the bounds of ground truth images x, i.e., having pixel values outside the range [-1, 1]. To remedy this, one or more of the DBGNNs 120 can use static thresholding or dynamic thresholding.

Static thresholding refers to a method where a DBGNN 120 clips its estimate $\hat{x}_\theta(z_t,c)$ to be within [-1, 1] at each sampling step t. Static thresholding can improve the quality of estimates when a DBGNN 120 uses large guidance weights and prevent generation of blank images.

Dynamic thresholding refers to a method where, at each sampling step t, a DBGNN 120 sets a clipping threshold $\kappa$ to a particular percentile p of absolute pixel value in the estimate $\hat{x}_\theta(z_t,c)$. In other words, the clipping threshold $\kappa$ is the particular value of $|\hat{x}_\theta(z_t,c)|$ that is greater than a percentage of values in $|\hat{x}_\theta(z_t,c)|$ defined by p, where | ... | denotes the pixel-wise absolute value. For example, p can be about 90% or more, about 95% or more, about 99% or more, about 99.5% or more, about 99.9% or more, about 99.95% or more. If κ>1, the DBGNN 120 clips the estimate to the range [−κ,κ] and then divides by κ to normalize. Dynamic thresholding pushes saturated pixels (e.g., those near −1 and 1) inwards, thereby actively preventing pixels from saturating at each sampling step. Dynamic thresholding generally results in improved photorealism and image-text alignment when a DBGNN 120 uses large guidance weights.

Alternatively or in addition, one or more of the DBGNNs 120 can allow co to oscillate between a high guidance weight (e.g., about 15) and a low guidance weight (e.g., about 1) at each sampling step t. Specifically, one or more of the DBGNNs 120 can use a constant high guidance weight for a certain number of initial sampling steps, followed by oscillation between high and low guidance weights. This oscillating method can reduce the number of saturation artifacts generated in an output image $\hat{x}$, particularly at low resolution stages in the sequence 121.

In implementations involving a DDIM sampler, progressive distillation, and classifier-free guidance, a DBGNN 120 may also incorporate a stochastic sampler to realize a two-stage distillation approach. For reference, a one-stage progressive distillation approach distills a trained DDIM sampler to a diffusion model that takes many fewer sampling steps, without losing much perceptual quality. At each iteration of the distillation process, the DBGNN 120 distills an N-step DDIM sampler into a new model with N/2-steps. The DBGNN 120 repeats this procedure by halving the sampling steps t each iteration. This one-stage approach was extended to samplers using classifier-free guidance, as well as to a new stochastic sampler, by Chenlin Meng et al., "On distillation of guided diffusion models". *arXiv preprint arXiv:2210.03142* (2022). A DBGNN 120 can use a modified two-stage approach for improved image generation. In particular, at the first stage, the DBGNN 120 learns a single diffusion model that matches the combined output from the jointly trained conditional and unconditional diffusion models, where the combination coefficients are determined by the guidance weight. The DBGNN 120 then applies progressive distillation to the single model to produce models involving fewer sampling steps at the second stage. After distillation, the DBGNN 120 uses a stochastic N-step sampler: at each step, the DBGNN 120 first applies one deterministic DDIM update with twice the original step size (i.e., the same step size as a N/2-step sampler), and then performs one stochastic step backward (i.e., perturbed with noise following the forward diffusion process) with the original step size. This stochastic backward stepping is described in more detail by Karras, Tero, et al., "Elucidating the design space of diffusion-based generative models," *arXiv preprint arXiv:2206.00364* (2022). Using this approach, a DBGNN 120 can distill down to much fewer sampling steps (e.g., about 8 steps) without any noticeable loss in perceptual quality of output images.

Figure 2A:
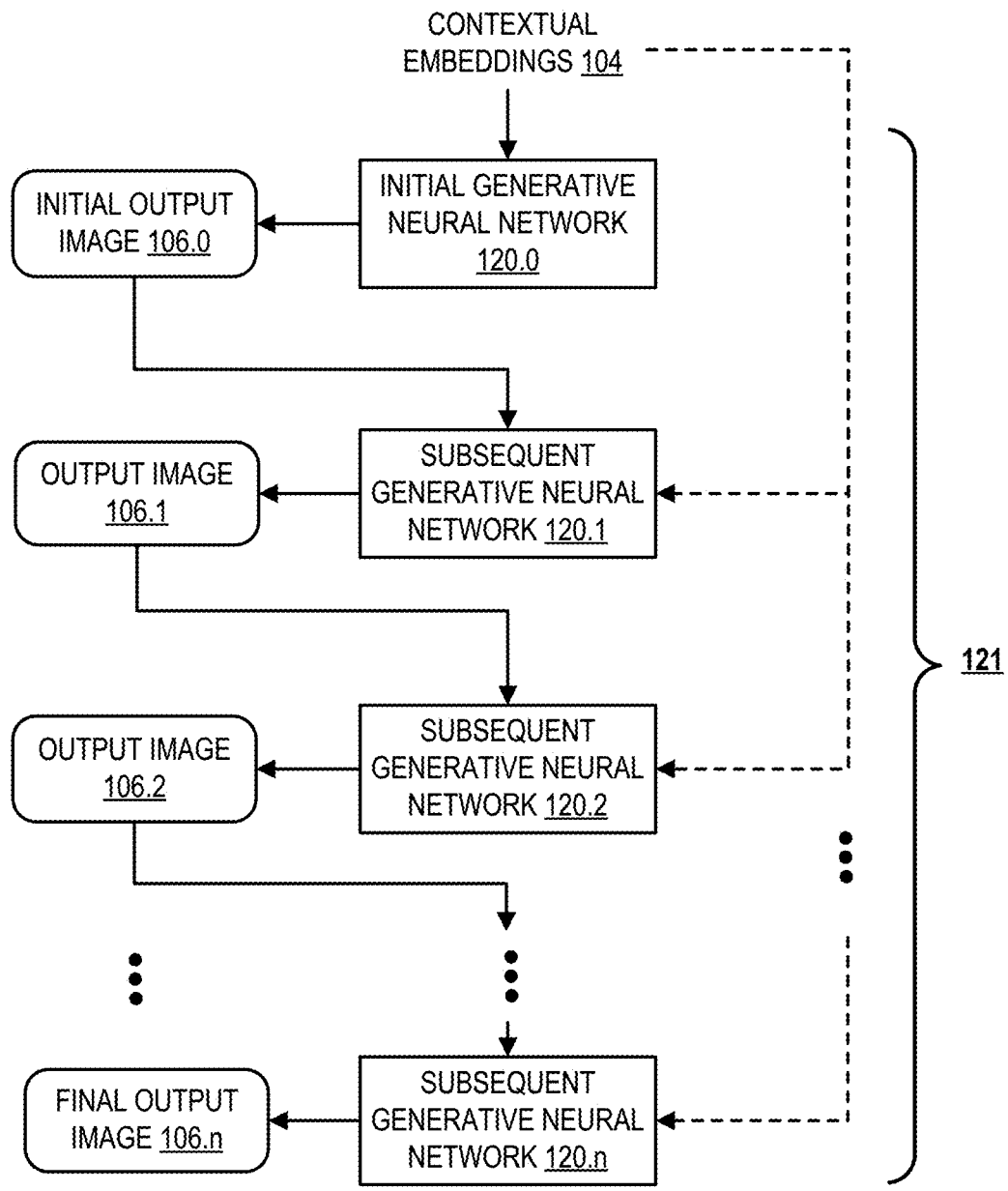
FIG. 2A shows a block diagram of an example sequence of generative neural networks.

FIG. 2A shows a block diagram of an example sequence of GNNs 121. The sequence 121 is an example of a system implemented as computer programs on one or more computers in one or more locations in which the systems, components, and techniques described below are implemented.

The sequence 121 or "cascade" includes multiple GNNs 120.0-n that are each configured to perform a specific step in the processing pipeline. Particularly, the sequence 121 includes an initial GNN 120.0 that generates an initial output image 106.0, followed by one or more subsequent GNNs 120.1-n. The subsequent GNNs 120.1-n progressively increase the resolution of the initial image 106.0 by generating respective output images 106.i based on received input images until a final output image 106.n is reached.

The initial GNN 120.0 is configured to receive a set of contextual embeddings 104 of a text prompt 102 as input $c^{(0)}=(u)$. The initial GNN 120.0 is configured to process the input to generate the initial output image ($\hat{x}^{(0)}$) 106.0. The initial image 106.0 has an initial resolution $R^{(0)}$. The initial resolution $R^{(0)}$ also corresponds to the dimensionality of the initial output image 106.0 and is generally of low dimensionality (e.g., 64×64 pixels).

As explained above, to generate the initial output image 106.0, the initial GNN 120.0 can sample a latent representation $z^{(0)}$ from its prior distribution $p_\theta(z^{(0)}|c^{(0)})$. The initial GNN 120.0 can then process the latent $z^{(0)}$ to generate the initial output image $\hat{x}^{(0)}$ from its conditional distribution $p_\theta(x^{(0)}|z^{(0)},c^{(0)})$. For example, the initial GNN 120.0 can sample an image from its conditional distribution, return the mean of its conditional distribution, return the image with the highest probability, or use an algorithm to choose between multiple high-probability images and/or sampled images.

In some implementations, the initial GNN 120.0 is a DBGNN. As explained above, the initial DBGNN 120.0 can perform a reversed process starting from t=1 and ending at t=0 to generate the initial output image 106.0. For example, the initial DBGNN 120.0 can sample a latent representation $z_1^{(0)}$ from its (reverse) prior distribution $z_1^{(0)} \sim \mathcal{N}(z_1^{(0)}; 0,I)$ at t=1 and continually update the latent $z_s^{(0)}$ at each sampling step using the ancestral sampler. That is, the initial DBGNN 120.0 can process a current latent $z_t^{(0)}$ and generate a current estimate $\hat{x}_\theta(z_t^{(0)},c^{(0)})$. The initial DBGNN 120.0 can then determine a new latent $z_s^{(0)}$ from the current estimate using the update rule for s<t. The initial DBGNN 120.0 updates the latent until reaching $z_0^{(0)}$ at t=0 and thereafter outputs the corresponding estimate as the initial output image $\hat{x}^{(0)}=\hat{x}_\theta(z_0^{(0)},c^{(0)})$. In some implementations, the initial DBGNN 120.0 uses one or more of a v-parametrization, progressive distillation, classifier-free guidance, and/or static or dynamic thresholding when generating the initial output image $\hat{x}^{(0)}$.

Each subsequent GNN 120.i is configured to receive a respective input $c^{(i)}=(\hat{x}^{(i-1)})$ that includes a respective input image $\hat{x}^{(i-1)}$ generated as output by a preceding GNN in the sequence 121. Each subsequent GNN 120.i is configured to process the respective input to generate a respective output image ($\hat{x}^{(i)}$) 106.i. As explained above, each subsequent GNN 120.i can also apply noise conditioning augmentation to their input image $\hat{x}^{(i-1)}$, e.g., Gaussian noise conditioning. In some implementations, the respective input $c^{(i)}=(\hat{x}^{(i-1)},u)$ of one or more of the subsequent GNNs 120.i also includes the contextual embeddings 104 of the text prompt 102. In further implementations, the respective input of each subsequent GNNs 120.i includes the contextual embeddings 104. The input image $\hat{x}^{(i-1)}$ and output image $\hat{x}(i)$ of each subsequent GNN 120.i has an input resolution $R^{(i-1)}$ and an output resolution $R^{(i)}$, respectively. The output resolution is higher than the input resolution $R^{(i)}>R^{(i-1)}$. Consequently, the resolution of the output images 106.0-n, and therefore their dimensionality, continually increases $R^{(n)}>R^{(n-1)}> \ldots >R^{(0)}$ until reaching the final resolution $R^{(n)}$ of the final output image 106.n, which is generally of high dimensionality (e.g., 1024×1024 pixels). For example, each subsequent GNN 120.i may receive a respective input image having k×k pixels (e.g., an image having a width of k pixels and a height of k pixels) and generate a respective output image having 2k×2k pixels, or 3k×3k pixels, or 4k×4k pixels, or 5k×5k pixels, etc.

As explained above, to generate an output image 106.*i*, a subsequent GNN 120.*i* can sample a latent representation $z^{(i)}$ from its prior distribution $p_\theta(z^{(i)}|c^{(i)})$. The subsequent GNN 120.*i* can then process the latent $z^{(i)}$ to generate the output image $\hat{x}^{(i)}$ from its conditional distribution $p_\theta(x^{(i)}|z^{(i)},c^{(i)})$. For example, the subsequent GNN 120.*i* can sample an image from its conditional distribution, return the mean of its conditional distribution, return the image with the highest probability, or use an algorithm to choose between multiple high-probability images and/or sampled images.

In some implementations, each subsequent GNN 120.*i* is a DBGNN. As explained above, a subsequent DBGNN 120.*i* can perform a reversed process starting from t=1 and ending at t=0 to generate an output image 106.*i*. For example, the subsequent DBGNN 120.*i* can sample a latent representation $z_t^{(i)}$ from its (reverse) prior distribution $z_1^{(i)} \sim \mathcal{N}(z_1^{(i)}, 0, I)$ at t=1 and continually update the latent $z_s^{(i)}$ at each sampling step using the ancestral sampler. That is, the subsequent DBGNN 120.*i* can process a current latent $z_t^{(i)}$ and generate a current estimate $\hat{x}_\theta(z_t^{(i)}, c^{(i)})$. The subsequent DBGNN 120.*i* can then determine a new latent $z_s^{(i)}$ from the current estimate using the update rule for s<t. The subsequent DBGNN 120.*i* updates the latent until reaching $z_0^{(i)}$ at t=0 and thereafter outputs the corresponding estimate as the output image $\hat{x}^{(i)} = \hat{x}_\theta(z_0^{(i)}, c^{(i)})$. In some implementations, the subsequent DBGNN 120.*i* uses one or more of a v-parametrization, progressive distillation, classifier-free guidance, and/or static or dynamic thresholding when generating their respective output image $\hat{x}^{(i)}$. In implementations involving noise conditioning augmentation, the input $c_t^{(i)} = (\hat{x}^{(i-1)}, u, \lambda'_t)$ of the subsequent DBGNN 120.*i* can also include a signal $\lambda'_t = \partial_t \lambda_t$ that controls the strength of the conditioning augmentation applied to the input image $\hat{x}^{(i-1)}$.

Figure 2B:
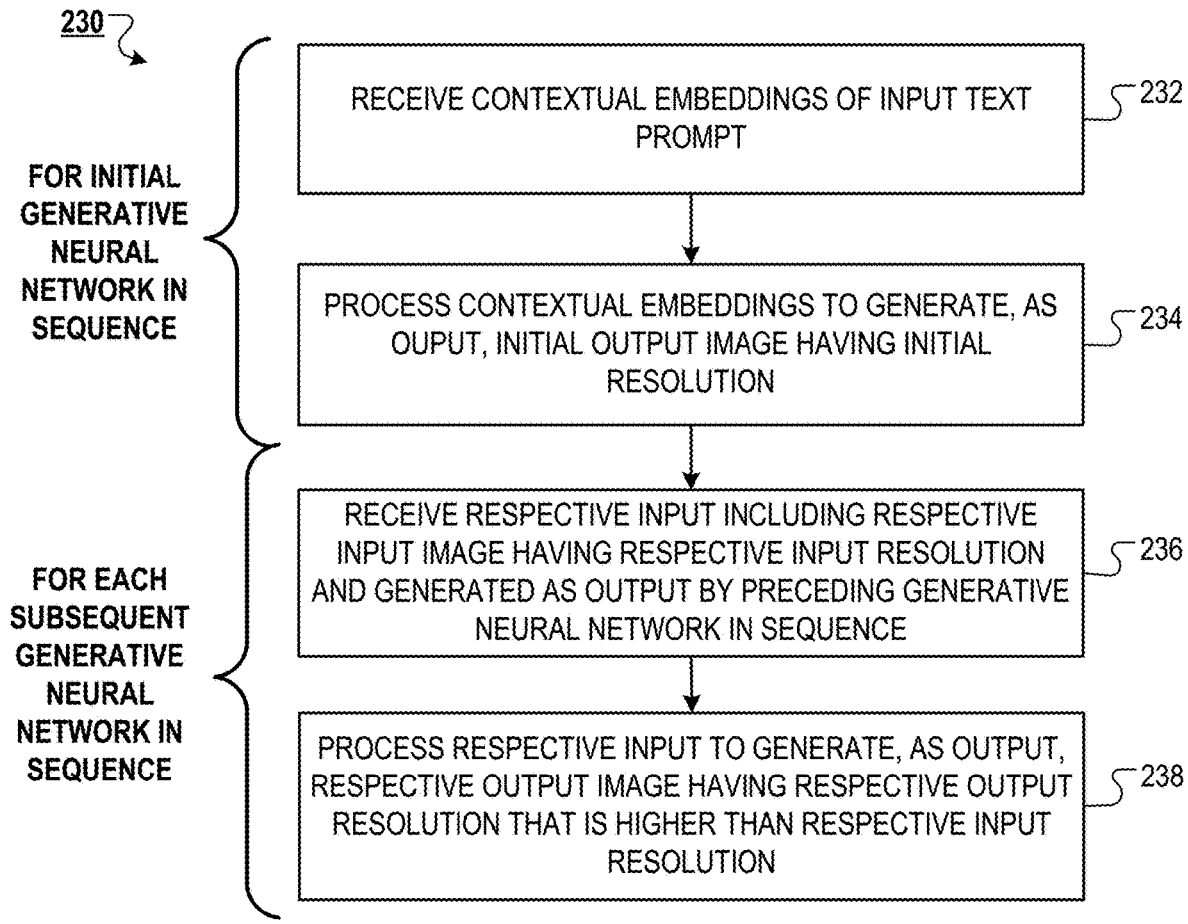
FIG. 2B is a flow diagram of an example process for processing a set of contextual embeddings using a sequence of generative neural networks.

FIG. 2B is a flow diagram of an example process 230 for processing a set of contextual embeddings of a text prompt using a sequence of generative neural networks. For convenience, the process 230 will be described as being performed by a system of one or more computers located in one or more locations. For example, a sequence of generate neural networks, e.g., the sequence of generative neural networks 121 of FIG. 2A, appropriately programmed in accordance with this specification, can perform the process 230.

The sequence of generative neural networks includes an initial generative neural network and one or more subsequent generative neural networks.

The initial generative neural network receives the contextual embeddings (232).

The initial generative neural network processes the contextual embeddings to generate, as output, an initial output image having an initial resolution (234).

For each subsequent generative neural network:

The subsequent generative neural network receives a respective input including a respective input image having a respective input resolution and generated as output by a preceding generative neural network in the sequence (236). In some implementations, the respective input for one or more of subsequent generative neural networks further includes the contextual embeddings. In some implementations, the respective input for each subsequent generative neural network includes the contextual embeddings.

The subsequent generative neural network processes the respective input to generate, as output, a respective output image having a respective output resolution that is higher than the respective input resolution (238).

In some implementations, each generative neural network in the sequence is a diffusion-based generative neural network.

Figure 3A:
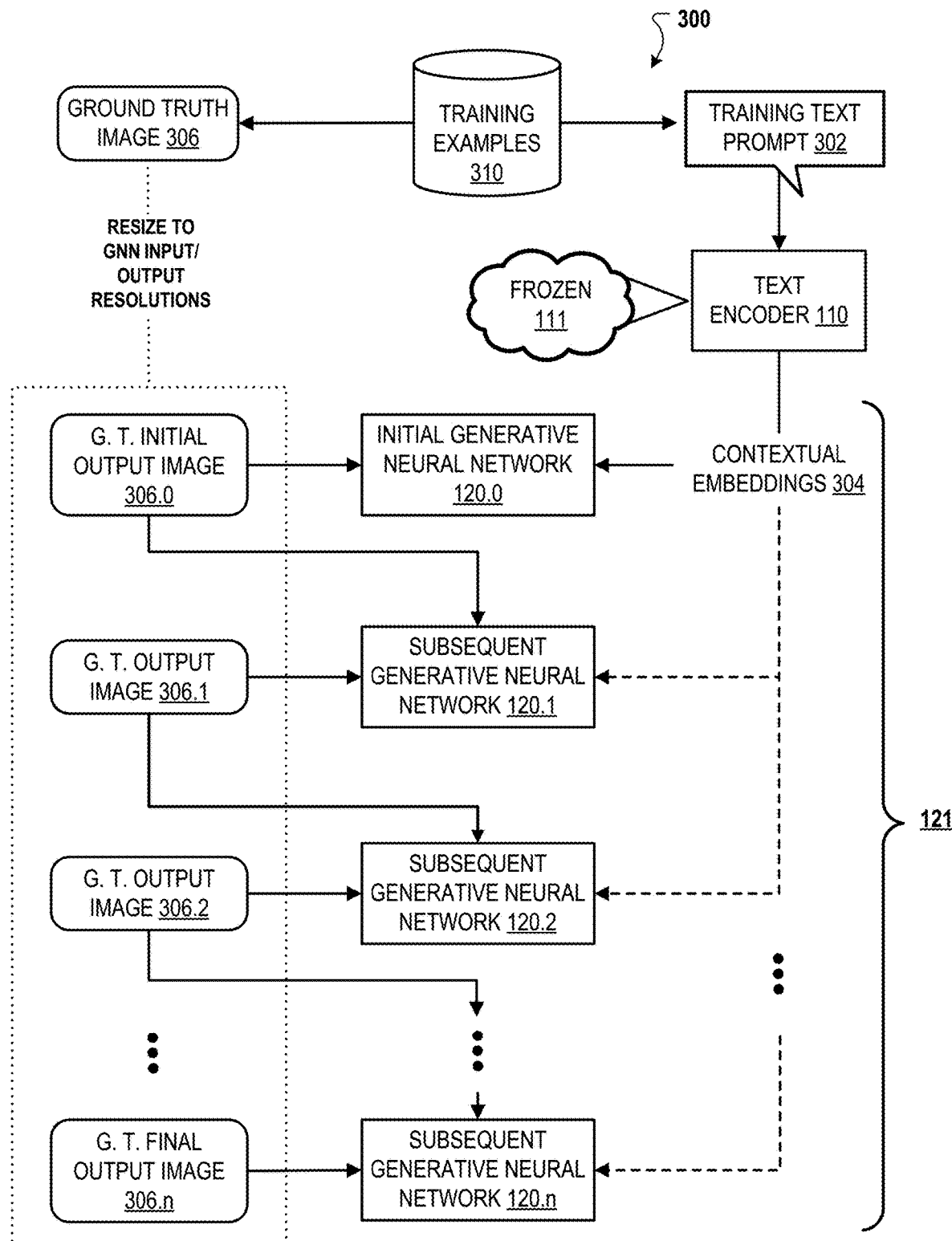
FIG. 3A shows a block diagram of an example training engine that can jointly train a sequence of generative neural networks.

FIG. 3A shows a block diagram of an example training engine 300 that can jointly train a sequence of GNNs 121. The training engine 300 is an example of a system implemented as computer programs on one or more computers in one or more locations in which the systems, components, and techniques described below are implemented.

The training engine 300 obtains a set of training examples 310, for instance, from a publicly available training set or any suitably labeled text-image training set. Each training example 310 includes: (i) a respective training text prompt ($\mathcal{T}$) 302 describing a particular scene, and (ii) a corresponding ground truth image (x) 306 depicting the particular scene. The text encoder neural network 110 processes the respective training text prompt 302 of each training example 310 to generate a corresponding set of contextual embeddings (u) 304 of the training text prompt 302. In some implementations, the text encoder 110 is pre-trained and held frozen 111 by the training engine 300 during the joint training of the GNNs 120.0-n. In other implementations, the text encoder 110 is pre-trained and fine-tuned on one or more of the training examples 310. For example, the training engine 300 can first train each GNN 120 in the sequence 121 with the text encoder 110 held frozen 111 and then fine-tune the text encoder 110 on one or more of the training examples 30 which, some cases, can yield even better text-image alignment. Particularly, since the contextual embeddings $u = u_\psi$ depend on the network parameters $\psi$ of the text encoder 110, the training engine 300 can further optimize any of the objective functions described herein with respect to $\psi$ to fine-tune the text encoder 110.

The training engine 300 resizes the ground truth image 306 of each training example 310 to the appropriate input and output resolutions of the GNNs 120.0-n. This produces ground truth output images $x^{(i)}$ 306.*i* scaled to the correct resolution $R^{(i)}$ for each GNN 120.*i*. For example, the training engine 300 can resize the ground truth images x to the appropriate resolutions of the GNNs 120.0-n by spatial resizing and/or cropping. After resizing, the training engine 300 can train each GNN 120.*i* in the sequence 121 in parallel and/or individually. With that in mind, training engine 300 can also use different optimization methods (e.g., stochastic gradient descent (SGD) methods) for different GNNs 120 in the sequence 121 to update their respective network parameters θ. For example, training engine 300 can use Adafactor for the initial GNN 120.0 and Adam for the subsequent GNNs 120.1 thru 120.*n*, among other combinations. Other examples of SGD methods include, but are not limited to, momentum, RMSProp, a second-order Newton-Raphson algorithm, etc. The modularity of the sequence 121 allows training engine 300 to optimize a training regime for each GNN 120.*i* to provide the best performance for the entire processing pipeline.

The training engine 300 trains the initial GNN 120.0 on image-input data pairs of the form $(x^{(0)}, c^{(0)})$. Here, $x^{(0)}$ is a ground truth initial output image 306.0 sized to the initial resolution $R^{(0)}$ of the initial GNN 120.0 and $c^{(0)} = (u)$ is a respective training input that includes the contextual embeddings 304 of the corresponding training text prompt 302. For the initial GNN 120.0 to learn an appropriate prior distribution $p_\theta(z^{(0)}|c^{(0)})$ and/or conditional distribution $p_\theta(x^{(0)}|z^{(0)}, c^{(0)})$, the training engine 300 can use an EM algorithm to maximize the likelihood of the data $p_\theta(x^{(0)}|c^{(0)})$ with respect to the initial GNN 120.0's network parameters $\theta^{(0)}$. Alternatively or in addition, the training engine 300 can optimize a suitable objective function $L_\theta(x^{(0)}, c^{(0)})$ with respect to $\theta^{(0)}$ that depends on $x^{(0)}$ and $c^{(0)}$, e.g., using a stochastic gradient descent method (SGD). In some implementations, the training engine 300 introduces a posterior distribution $q_\phi(z^{(0)}|x^{(0)}, c^{(0)})$ for the initial GNN 120.0 and optimizes an appropriate objective function with respect to $\theta^{(0)}$ and $\phi^{(0)}$, e.g., corresponding to the ELBO. When the initial GNN 120.0 is a DBGNN, the training engine 300 can minimize an objective function of the form:

$$L_\theta(x^{(0)}, c^{(0)}) = \mathbb{E}_{\epsilon,t}[W_t \|\hat{x}_\theta(\alpha_t x^{(0)} + \sigma_t \epsilon, c^{(0)}) - x^{(0)}\|_2^2]$$

with $\epsilon \sim \mathcal{N}(0, I)$ sampled from a standard normal distribution and $t \sim U(0,1)$ sampled from a uniform distribution over 0 and 1. As explained above, the initial DBGNN 120.0 can use one or more of a v-parametrization, progressive distillation, classifier-free guidance, and/or static or dynamic thresholding during training.

The training engine 300 trains a subsequent GNN 120.$i$ on image-input data pairs of the form $(x^{(i)}, c^{(i)})$. Here, $x^{(i)}$ is a ground truth output image 306.$i$ sized to the output resolution $R^{(i)}$ of the subsequent GNN 120.$i$ and $c^{(i)} = (x^{(i-1)})$ is a training input that includes the ground truth output image $x^{(i-1)}$ of a preceding GNN in the sequence 121, sized to its output resolution $R^{(i-1)}$. As explained above, the training engine 300 can also apply noise conditioning augmentation to $x^{(i-1)}$, e.g., Gaussian noise conditioning. In some implementations, the training input $c^{(i)} = (x^{(i-1)}, u)$ also includes the contextual embeddings 304 of the corresponding training text prompt 302. For the subsequent GNN 120.$i$ to learn an appropriate prior distribution $p_\theta(z^{(i)}|c^{(i)})$ and/or conditional distribution $p_\theta(x^{(i)}|z^{(i)}, c^{(i)})$, the training engine 300 can use an EM algorithm to maximize the likelihood of the data $p_\theta(x^{(i)}|c^{(i)})$ with respect to the subsequent GNN 120.$i$'s network parameters $\theta^{(i)}$. Alternatively or in addition, the training engine 300 can optimize a suitable objective function $L_\theta(x^{(i)}, c^{(i)})$ with respect to $\theta^{(i)}$ that depends on $x^{(i)}$ and $c^{(i)}$, e.g., using a SGD descent method. In some implementations, the training engine 300 introduces a respective posterior distribution go $q_\phi(z^{(i)}|x^{(i)}, c^{(i)})$ for the subsequent GNN 120.$i$ and optimizes an appropriate objective function with respect to $\theta^{(i)}$ and $\phi^{(i)}$, e.g., corresponding to the ELBO. When the subsequent GNN 120.$i$ is a DBGNN, the training engine 300 can minimize an objective function of the form:

$$L_\theta(x^{(i)}, c^{(i)}) = \mathbb{E}_{\epsilon,t}[W_t \|\hat{x}_\theta(\alpha_t x^{(i)} + \sigma_t \epsilon, c^{(i)}) - x^{(i)}\|_2^2]$$

with $\epsilon \sim \mathcal{N}(0, I)$ sampled from a standard normal distribution and $t \sim U(0,1)$ sampled from a uniform distribution over 0 and 1. As explained above, the subsequent DBGNN 120.$i$ can use one or more of a v-parametrization, progressive distillation, classifier-free guidance, and/or static or dynamic thresholding during training. In implementations involving noise conditioning augmentation, the subsequent DBGNN 120.$i$ can also add a signal $\lambda'_t = \partial \lambda_t$ to the training input $c_t^{(i)} = (x^{(i-1)}, u, \lambda'_t)$ that controls the strength of the conditioning augmentation applied to $x^{(i-1)}$.

Figure 3B:
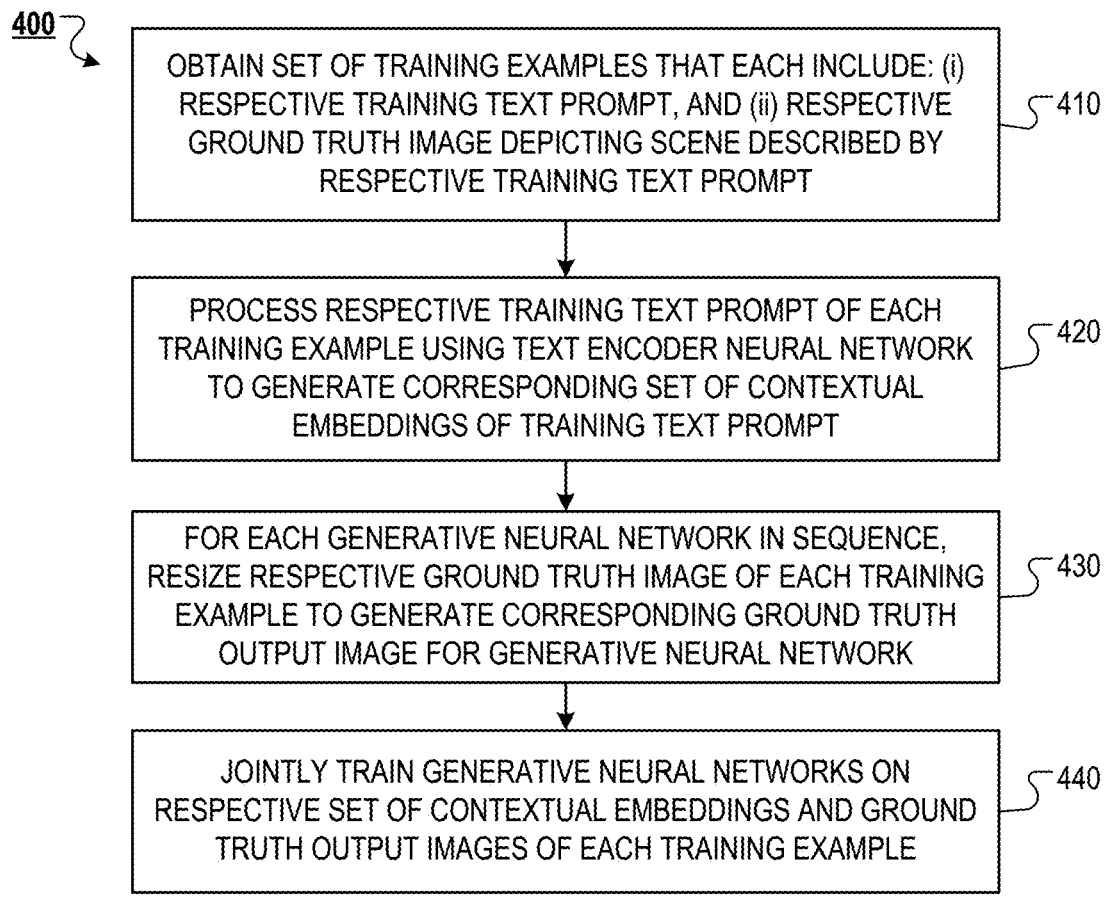
FIG. 3B shows a flow diagram of an example process for jointly training a sequence of generative neural networks.

FIG. 3B is a flow diagram of an example process 400 for jointly training a sequence of generative neural networks. For convenience, the process 400 will be described as being performed by a system of one or more computers located in one or more locations. For example, a training engine, e.g., the training engine 300 of FIG. 3A, appropriately programmed in accordance with this specification, can perform the process 400.

Training engine obtains a set of training examples that each include: (i) a respective training text prompt, and (ii) a respective ground truth image that depicts a scene that is described by the respective training text prompt (410).

Training engine processes the respective training text prompt of each training example using a text encoder neural network to generate a corresponding set of contextual embeddings of the training text prompt (420). In some implementations, the text encoder neural network is pre-trained and held frozen by the training engine during the joint training of the generative neural networks.

For each generative neural network in the sequence, training engine resizes the respective ground truth image of each training example to generate a corresponding ground truth output image for the generative neural network (430).

Training engine jointly trains the generative neural networks on the respective set of contextual embeddings and ground truth output images of each training example (440).

Figure 4:
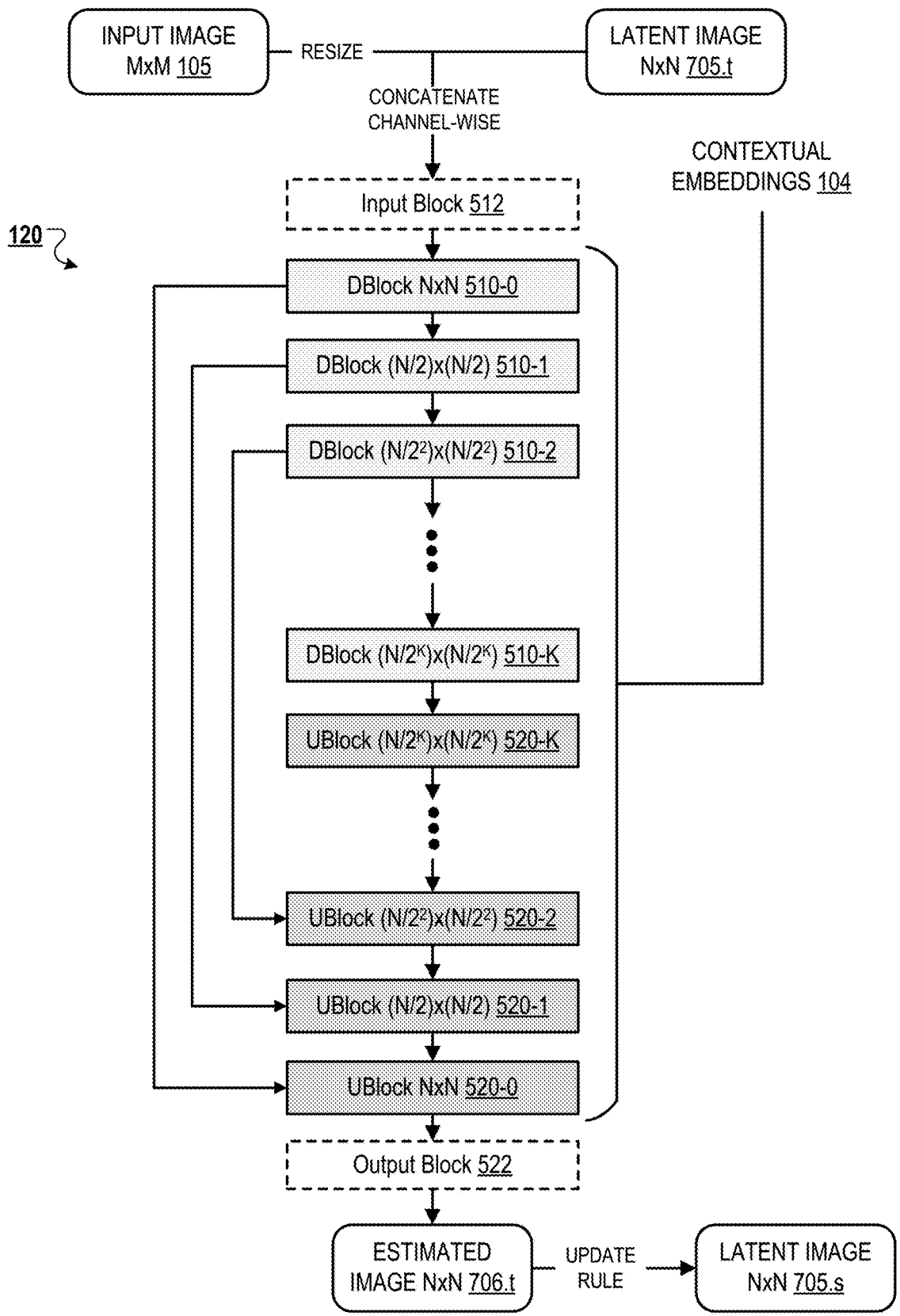
FIG. 4 shows a block diagram of an example U-Net architecture.

FIG. 4 shows a block diagram of an example U-Net architecture that can be implemented by a GNN 120. For example, an initial GNN 120.0 can implement the U-Net architecture as a base image generation model and one or more subsequent GNNs 120.1-$n$ can implement the U-Net architecture as super-resolution models. For ease of description, the U-Net architecture in FIG. 4 is described below with respect to diffusion models and square resolution images, although the architecture can be utilized for any type of generative model and images with rectangular resolutions. For example, the architecture in FIG. 4 can be used to model the mean and variance of a GNN 120's conditional distribution. As another example, the architecture in FIG. 4 can be adapted with different sized convolutional kernels and strides to perform downsampling and upsampling on rectangular resolution images. Dashed lines in FIG. 4 indicate optional layers.

As seen in FIG. 4, a DBGNN 120 can include an input block 512 (e.g., including one or more linear and/or convolutional layers) configured to process a latent representation of an image $(z_t)$ 705.$t$ at a sampling step t. In this case, the latent image 705.$t$ has the same resolution (N×N) as the output image 106 for the DBGNN 120. A subsequent DBGNN 120.1-$n$ can condition on its respective input image 105 (of resolution M×M) by resizing the input image 105 and thereafter concatenating channel-wise to the latent image 705.$t$ to generate a concatenated image having the output resolution (N×N). For example, a subsequent DBGNN 120.1-$n$ can upsample the input image 105 to the output resolution using bilinear or bicubic resizing before concatenating channel-wise to the latent image 705.$t$. Hence, a subsequent DBGNN 120.1-$n$ processes a concatenated image that includes its respective input image 105 "stacked" on the latent image 705.$t$. The initial DBNN 120.0 is not conditioned on an input image and therefore processes the latent image 705.$t$ directly. Note, a subsequent DBGNN 120.1-$n$ can condition on its respective input image 105 in a variety of ways, e.g., by processing a pre-processed version of the input image 105 to sharpen or enhance certain features. A subsequent DBGNN 120.1-$n$ can also correct or modify the input image 105 in some specified way, e.g., to alter colors.

The input block 512 is followed by a series of K+1 downsampling blocks (DBlocks) 510-0 thru 510-K. Each DBlock 510 is configured to receive a respective input image generated as output by a preceding block. Each DBlock 510 is configured to process the input image to generate a respective output image that is downsampled by a factor of 2×2 relative the input image. The DBlocks 510 are followed by a series of K+1 upsampling blocks (UBlocks) 520-0 thru 510-K. Each UBlock 520 is configured to receive a respective input image generated as output by a preceding block. Each UBlock 520 is configured to process the respective input image to generate a respective output image that is upsampled by a factor of 2×2 relative the input image. The DBlocks 510 and UBlocks 520 can implement one or more convolutional layers with appropriate strides to downsample and upsample their respective input images. The UBlocks 520 can also receive the output image of a respective DBlock 510, corresponding to the UBlock 520's input resolution, via a skip connection. In some implementations, the skip connections are scaled by a factor of $1/\sqrt{2}$ which can improve performance of the DBGNN 120.

The DBGNN 120 can also shift its network parameters from the higher resolution blocks (e.g., Blocks 510-0, 510-1, 520-0, and 520-1) to lower resolution blocks (e.g., Blocks 510-(K−1), 510-K, 520-(K−1), and 520-K). Since lower resolution blocks typically have many more channels, this allows the DBGNN 120 to increase its model capacity through more network parameters, without significant memory and computation costs.

One or more of the DBlocks 510 and UBlocks 520 can be conditioned on the contextual embeddings (u) 104 via an attention mechanism (e.g., cross-attention) using one or more self-attention layers. Alternatively or in addition, one or more of the DBlocks 510 and UBlocks 520 can be conditioned on the contextual embeddings 104 via a pooled vector of contextual embeddings using one or more intermediate layers (e.g., one or more pooling layers). In some implementations, one or more of the DBlocks 510 and UBlocks 520 can condition on other visual features that are expected in the output image, e.g., relating to specific colors or textural properties, or locations of objects, all of which can be obtained by the training engine 300 from the training images.

Finally, the output image of the final UBlock 520-0 can be processed by an output block 522 (e.g., including one or more dense layers) to generate an estimated image 706.$t$ for the sampling step t. The DBGNN 120 can then use the current estimate 706.$t$ to determine a latent image ($z_s$) 705.$s$ for a next sampling step s<t using an update rule (e.g., the ancestral sampler update rule).

The DBGNN 120 can repeat the above process for the new latent 705.$s$, and so on, until reaching a final sampling step t=0, and thereafter produce the current estimated image 706.$t$ as the output image 106. Hence, the DBGNN 120 can iteratively denoise a randomly sampled latent image $z_1$ at a sampling step of t=1 into the output image 106 which is output at the final sampling step t=0.

Figure 5A:
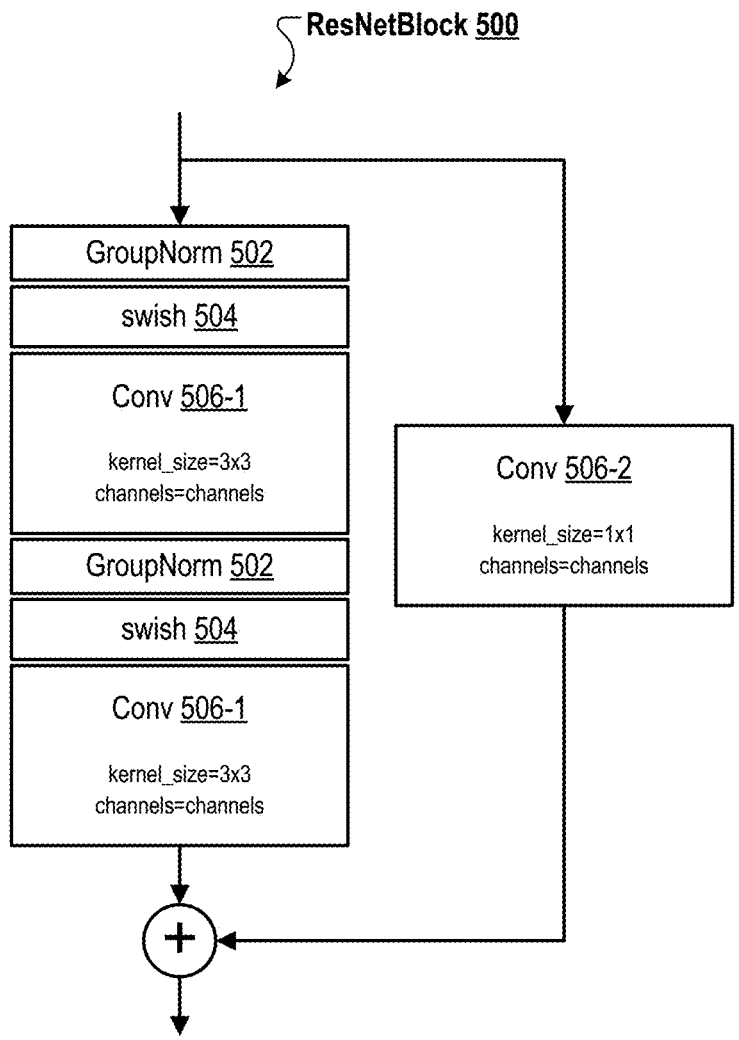
FIG. 5A shows a block diagram of an example ResNet-Block for an Efficient U-Net architecture.
Figure 5B:
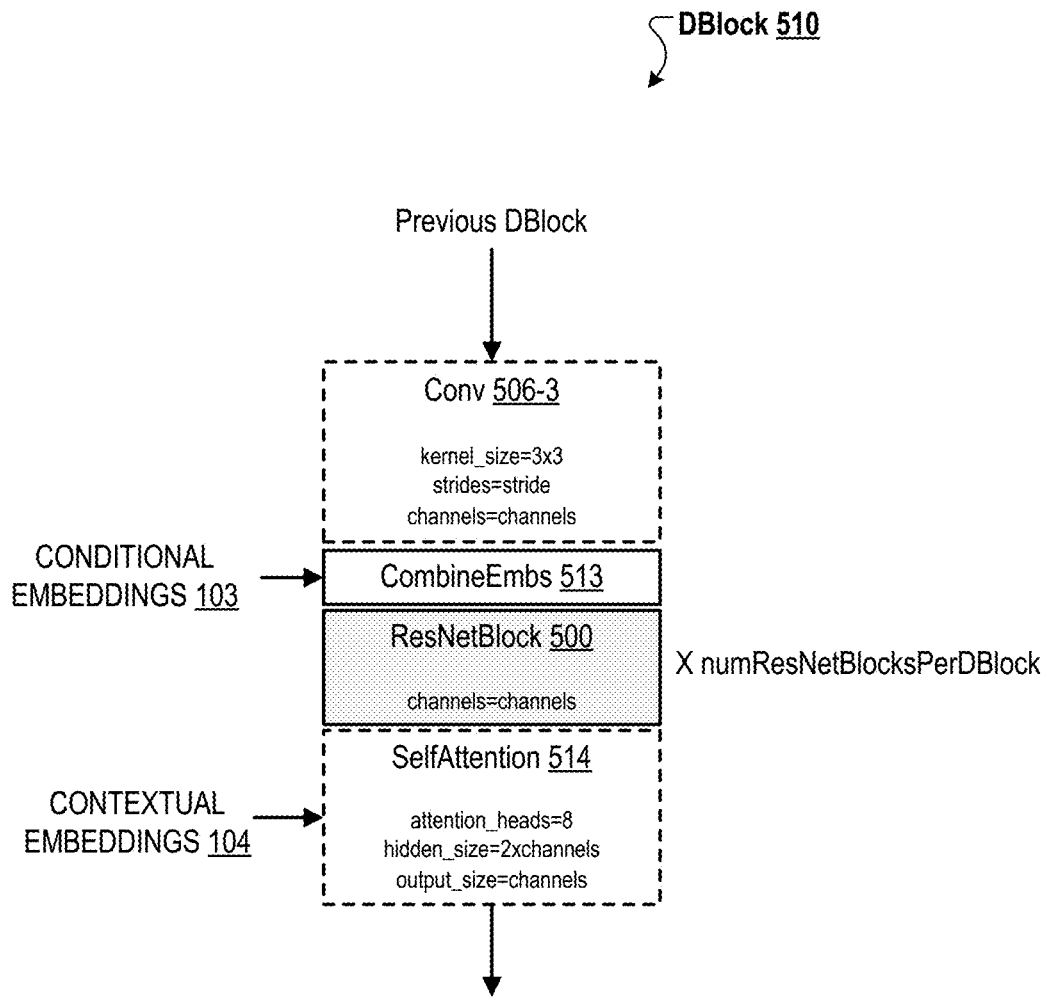
FIG. 5B shows a block diagram of an example DBlock for an Efficient U-Net architecture.
Figure 5C:
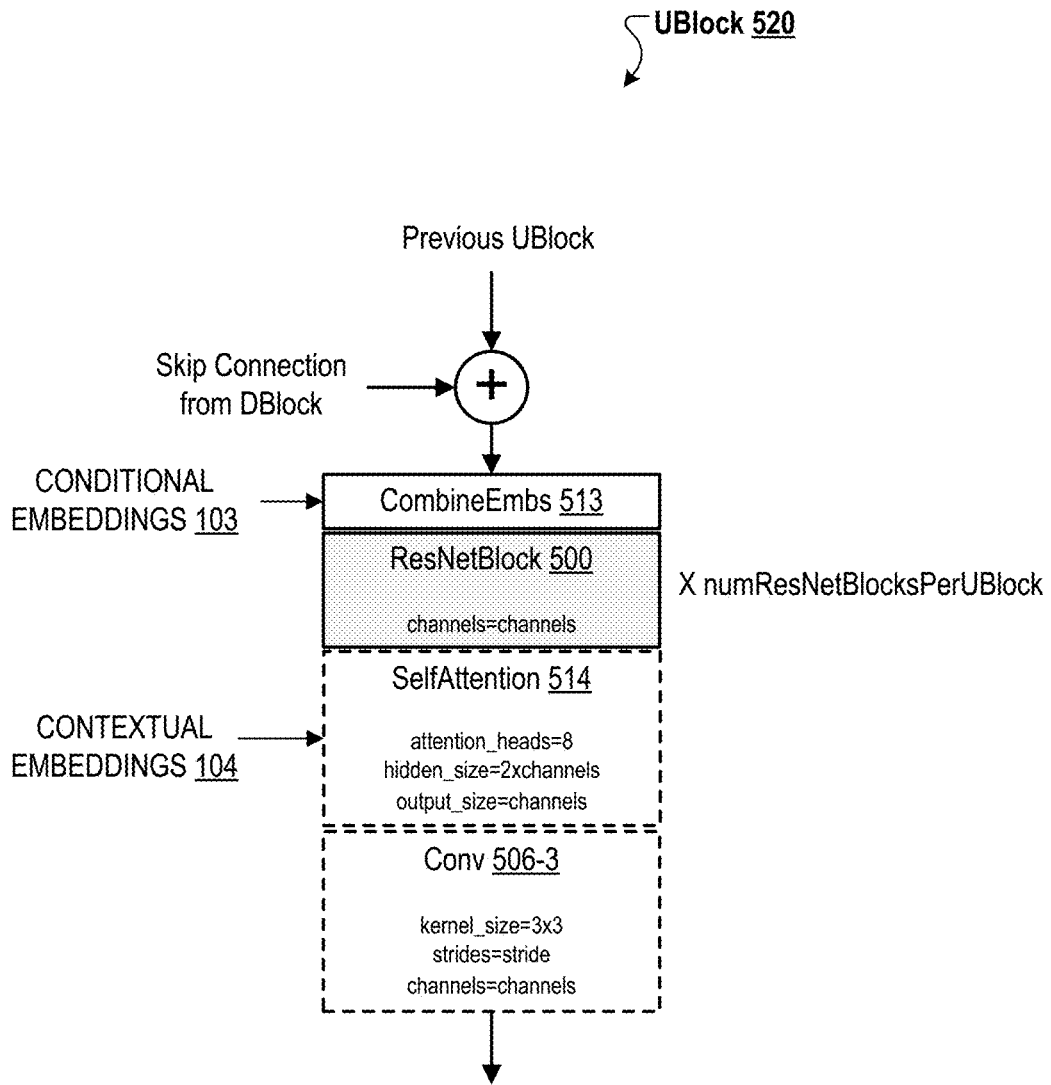
FIG. 5C shows a block diagram of an example UBlock for an Efficient U-Net architecture.

FIGS. 5A-5C show block diagrams of example neural network layer blocks for an Efficient U-Net architecture. The layers blocks in FIGS. 5A-5C can be implemented in the U-Net architecture shown in FIG. 4 to improve memory efficiency, reduce inference time, and increase convergence speed of GNNs 120 utilizing such architectures.

FIG. 5A is a block diagram of an example residual block (ResNetBlock) 500 for the Efficient U-Net architecture. The ResNetBlock 500 processes an input image through a sequence of layers: a group normalization (GroupNorm) layer 502, a swish activation layer 504, a convolutional (Conv) layer 506-1, another GroupNorm layer 502, another swish layer 504 and another Conv layer 506-1. A Conv layer 506-2 is in parallel with the sequence of layers which process the same input image. The respective output images of the sequence of layers and the Conv layer 202 are summed to generate an output image for the ResNetblock 500. The hyper-parameter of the ResNetBlock 500 is the number of channels (channels: int).

FIG. 5B is a block diagram of an example downsampling block (DBlock) 210 for the Efficient U-Net architecture.

The DBlock 510 includes a sequence of layers: a Conv layer 506-3, a CombineEmbs layer 513, one or more ResNetBlocks 500 configured according to FIG. 5A, and a SelfAttention layer 514. The Conv layer 506-3 performs the downsampling operation for the DBlock 510. The CombineEmbs layer 513 (e.g., a pooling layer) can receive conditional embeddings 103 (e.g., a pooled vector of contextual embeddings 104, a diffusion sampling step) to provide text prompt conditioning for the DBlock 510. The one or more ResNetBlocks 500 perform the convolutional operations for the DBlock 510. The SelfAttention layer 514 can perform attention mechanisms for the DBlock 510 such as cross-attention on the contextual embeddings 104 to provide further text prompt conditioning. For example, the contextual embeddings 104 can be concatenated to the key-value pairs of the SelfAttention layer 514.

The hyper-parameters of a DBlock 510 include: the stride of the DBlock 510 if there is downsampling (stride: Optional [Tuple[int, int]]), the number of ResNetBlocks 500 per DBlock 510 (numResNetBlocksPerBlock: int), and the number of channels (channels: int). The dashed lined blocks in FIG. 5B are optional, e.g., not every DBlock 510 needs to downsample or needs self-attention.

Note, in a typical U-Net DBlock, the downsampling operation occurs after the convolutional operations. In this case, the downsampling operation implemented via the Conv Layer 506-3 occurs before the convolutional operations are implemented via the one or more ResNetBlocks 500. This reverse order can significantly improve the speed of the forward pass of the DBlock 210, with little or no performance degradation.

FIG. 5C is a block diagram of an example upsampling block (UBlock) 520 for the Efficient U-Net architecture.

The UBlock 520 includes a sequence of layers: a CombineEmbs layer 513, one or more ResNetBlocks 500 configured according to FIG. 5A, a SelfAttention layer 514, and a Conv layer 506-3. The CombineEmbs layer 513 (e.g., a pooling layer) can receive conditional embeddings 103 (e.g., a pooled vector of contextual embeddings 104, a diffusion time step) to provide text prompt conditioning for the UBlock 520. The one or more ResNetBlocks 500 perform the convolutional operations for the UBlock 520. The SelfAttention layer 514 can perform attention mechanisms for the UBlock 520 such as cross-attention on the contextual embeddings 104 to provide further text prompt conditioning. For example, the contextual embeddings 104 can be concatenated to the key-value pairs of the SelfAttention layer 514. The Conv layer 506-3 performs the upsampling operation for the UBlock 520.

The hyper-parameters of a UBlock 520 include: the stride of the UBlock 520 if there is upsampling (stride: Optional [Tuple[int, int]]), the number of ResNetBlocks 500 per UBlock 520 (numResNetBlocksPerBlock: int), and the number of channels (channels: int). The dashed lined blocks in FIG. 5C are optional, e.g., not every UBlock 520 needs to downsample or needs self-attention.

Note, in a typical U-Net UBlock, the upsampling operation occurs before the convolutional operations. In this case, the upsampling operation implemented via the Conv Layer 506-3 occurs after the convolutional operations are implemented via the one or more ResNetBlocks 500. This reverse order can significantly improve the speed of the forward pass of the UBlock 520, with little or no performance degradation.

Figure 5D:
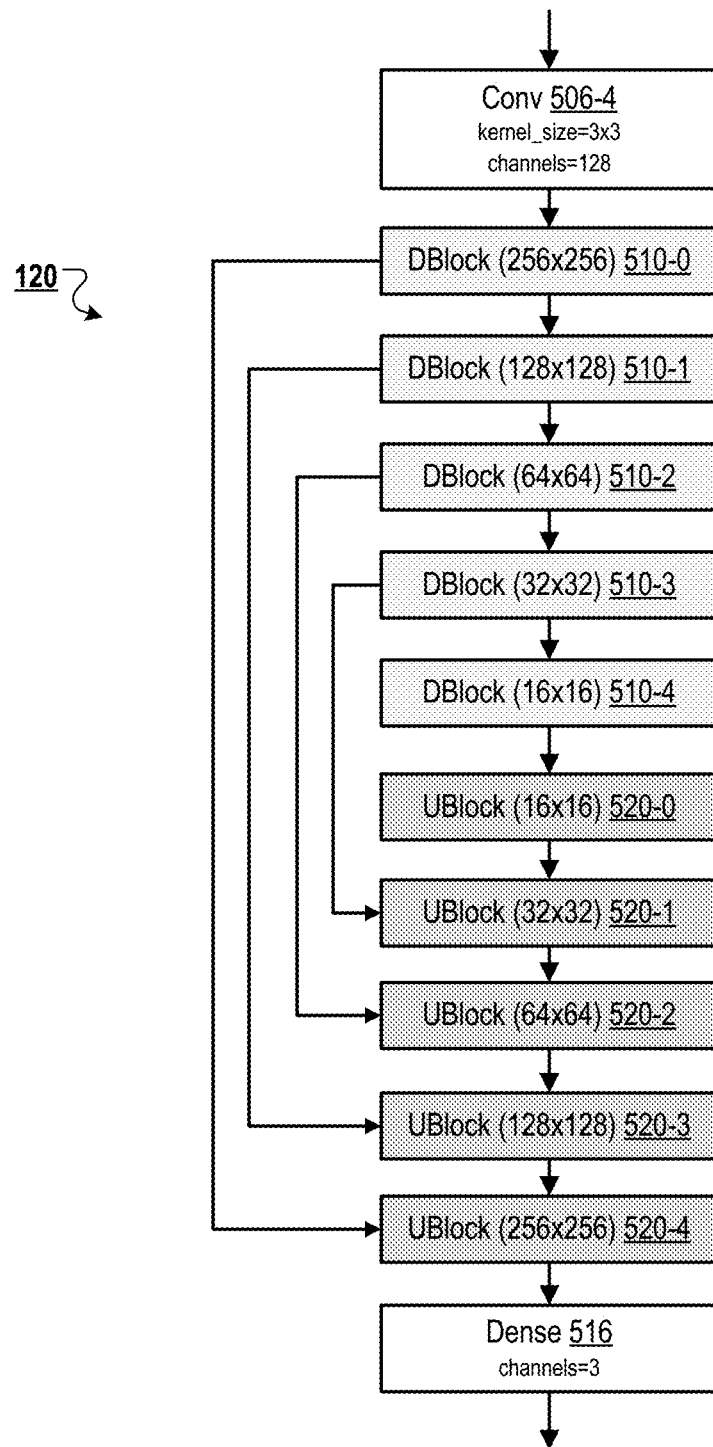
FIG. 5D shows a block diagram of an example Efficient U-Net architecture implemented as a super-resolution model.

FIG. 5D shows a block diagram of an example Efficient U-Net architecture that can be implemented by a subsequent GNN 120.1-n as a super-resolution model for 64×64→256× 256 input-to-output image upscaling. The architecture in FIG. 5D is arranged similarly to FIG. 4, having an input block 512 configured as a Conv layer 506-4, a series of five DBlocks 510-0 thru 510-4 configured according to FIG. 5B, a series of five UBlocks 520-0 thru 520-4 configured according to FIG. 5C, and an output block 522 configured as a Dense layer 516.

Figure 6A:
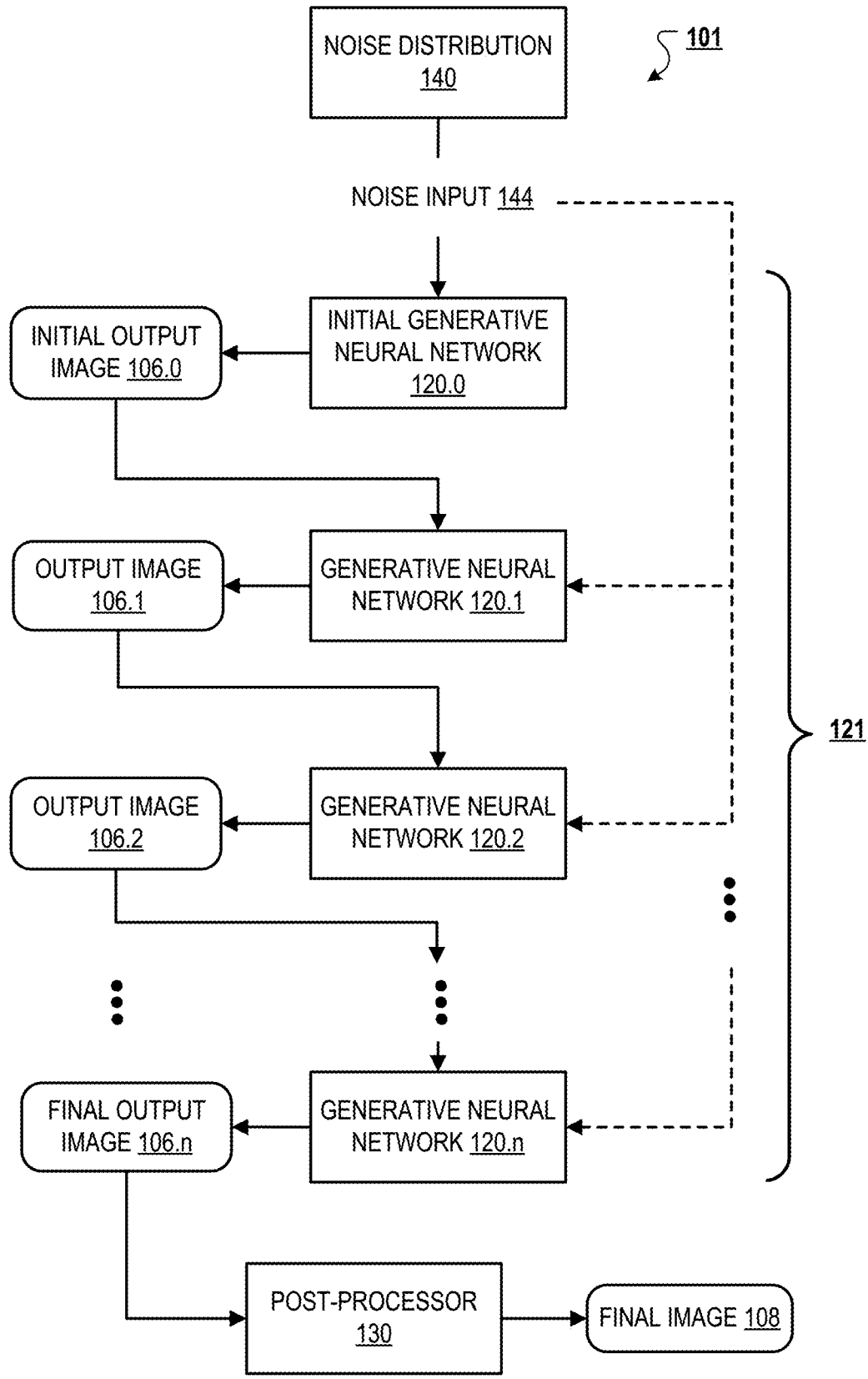
FIG. 6A shows a block diagram of an example image generation system that can generate images from noise.

FIG. 6A shows a block diagram of an example image generation system 101 that can generate images from noise. The image generation system 101 is an example of a system implemented as computer programs on one or more computers in one or more locations in which the systems, components, and techniques described below are implemented.

Although this specification is generally directed at text-to-image generation, the image generation systems disclosed herein are not limited to such and can be applied to any conditioned image generation problem. For example, the image generation system 101 shown in FIG. 6A can generate images from noise which amounts to changing the conditioning input into the image generation system 100 of FIG. 1A, e.g., replacing text prompts 102 with noise inputs 114. In general, the conditioning input can be any desired input such as a pre-existing image, a video, an audio waveform, an embedding of any of these, combination thereof, and so on.

The image generation system 101 can sample a noise input (v) 114 from a noise distribution p(v) 140. For example, the noise distribution 140 can be a binomial distribution, a normal distribution, a Poisson distribution, a Beta distribution, a Kumaraswamy distribution, or any desired noise (or probability) distribution. The system 101 may sample the noise input 114 in response to a query, such as a user generated or automatically generated query. For example, the system 101 may receive a query to generate a random image and thereafter sample the noise input 114 from the noise distribution 140. The system 101 processes the noise input 114 through a sequence of GNNs 121 to generate a final output image 106.n that, in some implementations, is further processed by the post-processor 130 to generate a final image 108. As explained above, the post-processor 130 may apply transformations to the output image 106.n, conduct image classification on the output image 106.n, and/or image quality analysis on the output image 106.n, etc. In this case, the final image 108 depicts a random scene since the sequence 121 is conditioned on a random noise input 114, as opposed to a text prompt 102 describing a particular scene.

To summarize, the sequence 121 includes an initial GNN 120.0 and one or more subsequent GNNs 120.1-n. The initial GNN 120.0 is configured to receive the noise input 114 as a conditioning input $c^{(0)}=(v)$. The initial GNN 120.0 is configured to process the conditioning input to generate an initial output image $(\hat{x}^{(0)})$ 106.0. The initial output image 106.0 has an initial resolution $R^{(0)}$. Each subsequent GNN 120.i is configured to receive a respective input $c^{(i)}=(\hat{x}^{(i-1)})$ that includes a respective input image $\hat{x}^{(i-1)}$ generated as output by a preceding GNN in the sequence 121. Each subsequent GNN 120.i is configured to process the respective input to generate a respective output image $(\hat{x}^{(i)})$ 106.i. In some implementations, the respective input for one or more of subsequent GNNs 120.i also includes the noise input $c^{(i)}=(\hat{x}^{(i-1)},v)$. In further implementations, the respective input for each subsequent GNN 120.i includes the noise input 114. The input image $\hat{x}^{(i-1)}$ and output image $\hat{x}^{(i)}$ of each subsequent GNN 120.i has an input resolution $R^{(i-1)}$ and an output resolution $R^{(i)}$, respectively. The output resolution is higher than the input resolution $R^{(i)}>R^{(i-1)}$. The GNNs 120.0-n can utilize any of the techniques described above for GNNs and DBGNNs to generate output images $\hat{x}^{(i)}$ based on conditioning inputs $c^{(i)}$. The GNNs 120.0-n can also utilize any of the neural network architectures described with respect to FIGS. 4 and 5A-5D.

A training engine (e.g., the training engine 300 of FIG. 3A) can train the sequence 121 to generate output images R from noise in a similar manner as a text. Training involves slight modifications to the training regime outlined in FIG. 3A since the training set generally includes unlabeled images as opposed to labelled text-image pairs. That being said, the training engine can train the sequence 121 of system 101 on a very large set of images since the images do not need to be labelled. For example, the training engine can obtain unlabeled images from large public databases.

In this case, the training engine can sample pairs of ground truth images and noise inputs jointly from a joint distribution $(x,v)\sim p(x,v)$. The joint distribution $p(x,v)=p(x|v)p(v)$ describes the statistics of the data. Here, $p(v)$ is the noise distribution 140 and $p(x|v)$ is the likelihood of x given v. The likelihood can be modelled by the training engine in a variety of ways to associate randomly sampled noise inputs v with ground truth images x. For example, the training engine may model the likelihood as a normal distribution $p(x|v)=\mathcal{N}(x;\mu(v),\Sigma(v))$ such that x is localized around $\mu(v)$ and highly correlated with v. After sampling data pairs (x,v), the training engine can then resize the sampled ground truth images x to the appropriate input and output resolutions of the GNNs 120.0-n.

The training engine can train the initial GNN 120.0 on sampled image-input pairs of the form $(x^{(0)},c^{(0)})$. Here, $x^{(0)}$ is a ground truth initial output image sized to the initial resolution) $R^{(0)}$ of the initial GNN 120.0 and $c^{(0)}=(v)$ is a respective training input that includes the corresponding noise input 114. The training engine can train a subsequent GNN 120.i on sampled image-input pairs of the form $(x^{(i)}, c^{(i)})$. Here, $x^{(i)}$ is a ground truth output image sized to the output resolution $R^{(i)}$ of the subsequent GNN 120.i and $c^{(i)}=(x^{(i-1)})$ is a training input that includes the ground truth output image $x^{(i-1)}$ of a preceding GNN in the sequence 121, sized to its output resolution $R^{(i-1)}$. In some implementations, the training input $c^{(i)}=(x^{(i-1)},v)$ also includes the corresponding noise input 114. The training engine can use any of the techniques described above for GNNs and DBGNNs to train the sequence 121 on image-input data pairs.

Figure 6B:
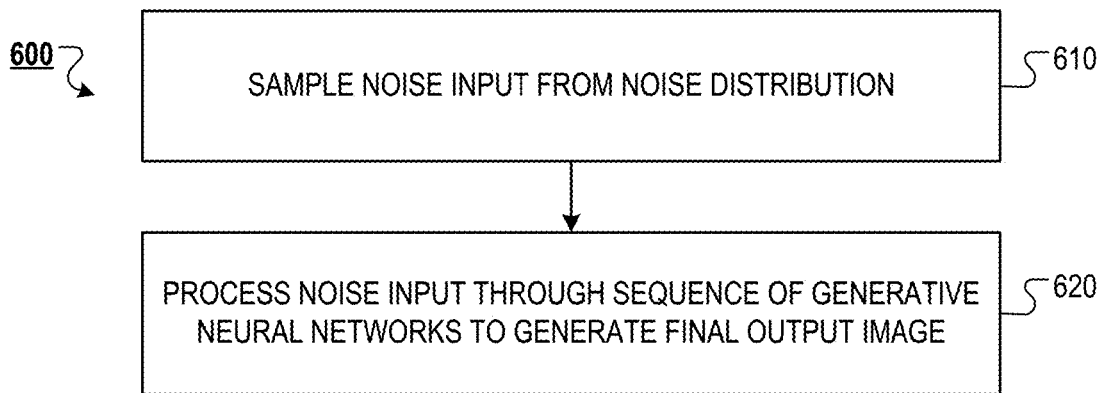
FIG. 6B is a flow diagram of an example process for generating an image from noise.

FIG. 6B is a flow diagram of an example process for generating an image from noise. For convenience, the process 600 will be described as being performed by a system of one or more computers located in one or more locations. For example, an image generation system 101, e.g., the image generation system 101 of FIG. 6A, appropriately programmed in accordance with this specification, can perform the process 600.

The system samples a noise input from a noise distribution (610). The noise distribution can be, e.g., a Gaussian noise distribution. The noise input can be a noise image, e.g., where each pixel value in the noise image is sampled from the noise distribution.

The system processes the noise input through a sequence of generative neural networks to generate a final output image (620). An example process for generating an image from noise using a sequence of generative neural networks is described in more detail below with reference to FIG. 6C.

Figure 6C:
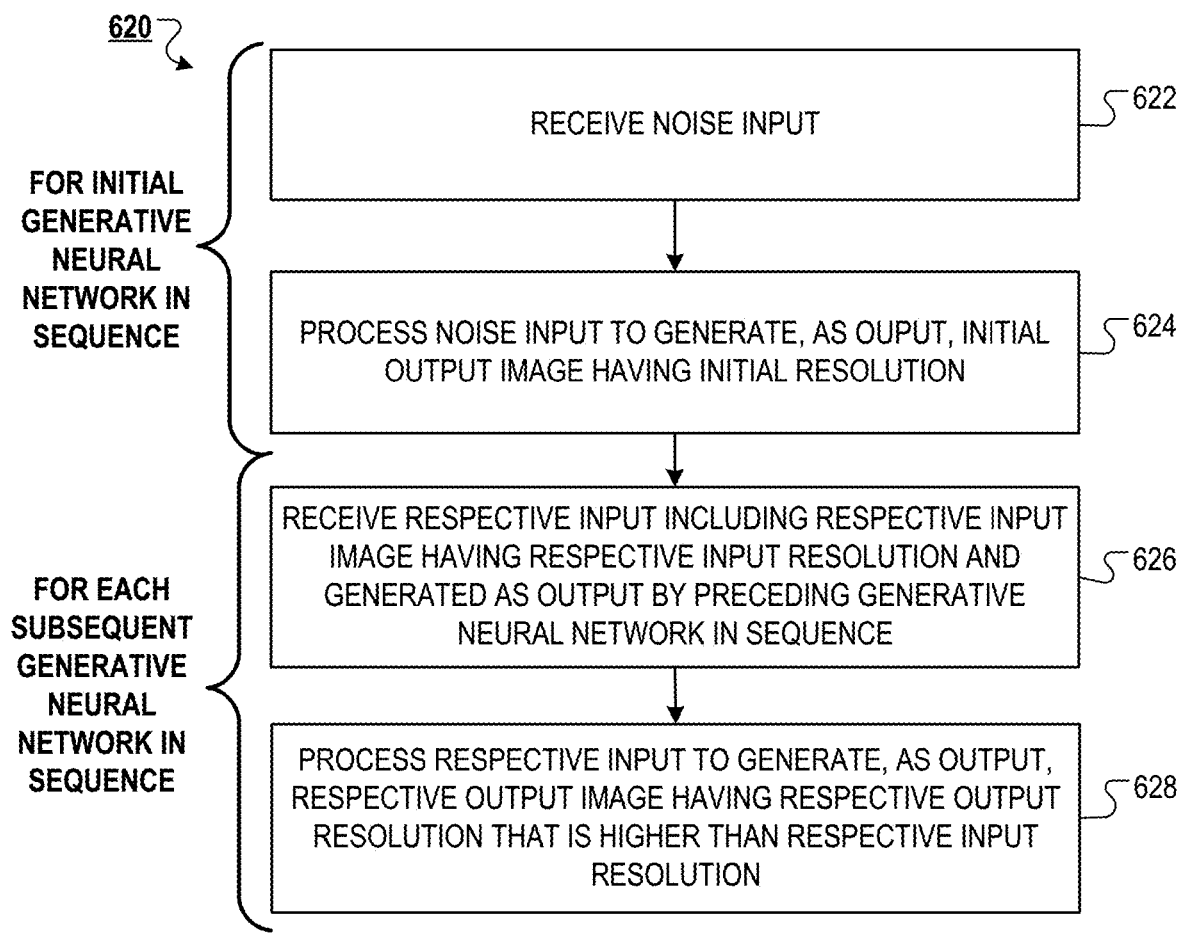
FIG. 6C is a flow diagram of an example process for processing a noise input using a sequence of generative neural networks.

FIG. 6C is a flow diagram of an example process for generating an image from noise using a sequence of generative neural networks. For convenience, the process 620 will be described as being performed by a system of one or more computers located in one or more locations. For example, a sequence of generative neural networks, e.g., the sequence of generative neural networks 121 of FIG. 6A, appropriately programmed in accordance with this specification, can perform the process 620.

The sequence of generative neural networks includes an initial generative neural network and one or more subsequent generative neural networks.

The initial generative neural network receives the noise input (622).

The initial generative neural network processes the noise input to generate, as output, an initial output image having an initial resolution (624).

For each subsequent generative neural network:

The subsequent generative neural network receives a respective input including a respective input image having a respective input resolution and generated as output by a preceding generative neural network in the sequence (626). In some implementations, the respective input for one or more of the subsequent generative neural networks further includes the noise input. In some implementations, the respective input for each subsequent generative neural network includes the noise input.

The subsequent generative neural network processes the respective input to generate, as output, a respective output image having a respective output resolution that is higher than the respective input resolution (628).

In some implementations, each generative neural network in the sequence is a diffusion-based generative neural network. Examples implementations of diffusion-based generative neural networks are described throughout this specification, e.g., with reference to FIG. 1B.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or image player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. A method performed by one or more computers, the method comprising:
    receiving an input text prompt comprising a sequence of text tokens in a natural language;
    processing the input text prompt using a text encoder neural network to generate a set of contextual embeddings of the input text prompt; and
    processing the contextual embeddings through a sequence of diffusion-based generative neural networks to generate a final output image that depicts a scene that is described by the input text prompt, wherein the sequence of diffusion-based generative neural networks comprises:
    an initial diffusion-based generative neural network configured to:
        receive the contextual embeddings; and
        process the contextual embeddings to generate, as output, an initial output image having an initial resolution; and one or more subsequent diffusion-based generative neural networks each configured to:
  receive a respective input comprising: (i) the contextual embeddings, and (ii) a respective input image having a respective input resolution and generated as output by a preceding diffusion-based generative neural network in the sequence; and
  process the respective input to generate, as output, a respective output image having a respective output resolution that is higher than the respective input resolution,
wherein for each subsequent diffusion-based generative neural network, processing the respective input to generate the respective output image comprises:
  sampling a latent image having the respective output resolution; and
  denoising the latent image over a sequence of steps into the respective output image, comprising, for each step that is not a final step in the sequence of steps:
    receiving a latent image for the step;
    processing the respective input and the latent image for the step to generate an estimated image for the step;
    dynamically thresholding pixel values of the estimated image for the step; and
    generating a latent image for a next step using at least the estimated image for the step.

2. The method of claim 1, wherein the text encoder neural network is a self-attention encoder neural network.

3. The method of claim 1, wherein:
  the diffusion-based generative neural networks in the sequence have been trained jointly on a set of training examples that each include: (i) a respective training text prompt, and (ii) a respective ground truth image that depicts a scene described by the respective training text prompt; and
  the text encoder neural network has been pre-trained and was held frozen during the joint training of the diffusion-based generative neural networks in the sequence.

4. The method of claim 1, wherein the diffusion-based generative neural networks have been trained using classifier-free guidance.

5. The method of claim 1, wherein each diffusion-based generative neural network uses a v-prediction parametrization to generate the respective output image.

6. The method of claim 1, wherein each diffusion-based generative neural network uses progressive distillation to generate the respective output image.

7. The method of claim 1, wherein denoising the latent image over the sequence of steps into the respective output image further comprises, for the final step in the sequence of steps:
  receiving a latent image for the final step; and
  processing the respective input and the latent image for the final step to generate the respective output image.

8. The method of claim 1, wherein processing the respective input and the latent image for the step to generate the estimated image for the step comprises:
  resizing the respective input image to generate a respective resized input image having the respective output resolution;
  concatenating the latent image for the step with the respective resized input image to generate a concatenated image for the step; and
  processing the concatenated image for the step with cross-attention on the contextual embeddings to generate the estimated image for the step.

9. The method of claim 1, wherein dynamically thresholding the pixel values of the estimated image for the step comprises:
  determining a clipping threshold based on the pixel values of the estimated image for the step; and
  thresholding the pixel values of the estimated image for the step using the clipping threshold.

10. The method of claim 9, wherein determining the clipping threshold based on the pixel values of the estimated image for the step comprises:
  determining the clipping threshold based on a particular percentile absolute pixel value in the estimated image for the step.

11. The method of claim 9, wherein thresholding the pixel values of the estimated image for the step using the clipping threshold comprises:
  clipping the pixel values of the estimated image for the step to a range defined by $[-\kappa,\kappa]$, wherein $\kappa$ is the clipping threshold.

12. The method of claim 11, wherein thresholding the pixel values of the estimated image for the step using the clipping threshold further comprises:
  after clipping the pixel values of the estimated image for the step, dividing the pixel values of the estimated image for the step by the clipping threshold.

13. The method of claim 1, wherein each subsequent diffusion-based generative neural network applies noise conditioning augmentation to the respective input image.

14. The method of claim 1, wherein the final output image is the respective output image of a final diffusion-based generative neural network in the sequence.

15. The method claim 1, wherein each subsequent diffusion-based generative neural network receives a respective k×k input image and generates a respective 4k×4k output image.

16. The method of claim 1, wherein the one or more subsequent diffusion-based generative neural networks comprise a plurality of subsequent diffusion-based generative neural networks.

17. A system comprising one or more computers and one or more storage devices storing instructions that, when executed by the one or more computers, cause the one or more computers to perform operations comprising:
  receiving an input text prompt comprising a sequence of text tokens in a natural language;
  processing the input text prompt using a text encoder neural network to generate a set of contextual embeddings of the input text prompt; and
  processing the contextual embeddings through a sequence of diffusion-based generative neural networks to generate a final output image that depicts a scene that is described by the input text prompt, wherein the sequence of diffusion-based generative neural networks comprises:
    an initial diffusion-based generative neural network configured to:
      receive the contextual embeddings; and
      process the contextual embeddings to generate, as output, an initial output image having an initial resolution; and
    one or more subsequent diffusion-based generative neural networks each configured to:
      receive a respective input comprising: (i) the contextual embeddings, and (ii) a respective input image having a respective input resolution and generated as output by a preceding diffusion-based generative neural network in the sequence; and process the respective input to generate, as output, a respective output image having a respective output resolution that is higher than the respective input resolution, wherein for each subsequent diffusion-based generative neural network, processing the respective input to generate the respective output image comprises:

sampling a latent image having the respective output resolution; and denoising the latent image over a sequence of steps into the respective output image, comprising, for each step that is not a final step in the sequence of steps:

receiving a latent image for the step;

processing the respective input and the latent image for the step to generate an estimated image for the step;

dynamically thresholding pixel values of the estimated image for the step; and generating a latent image for a next step using at least the estimated image for the step.

18. One or more non-transitory computer-readable storage media storing instructions that, when executed by one or more computers, cause the one or more computers to perform operations comprising:

receiving an input text prompt comprising a sequence of text tokens in a natural language;

processing the input text prompt using a text encoder neural network to generate a set of contextual embeddings of the input text prompt; and processing the contextual embeddings through a sequence of diffusion-based generative neural networks to generate a final output image that depicts a scene that is described by the input text prompt, wherein the sequence of diffusion-based generative neural networks comprises:

an initial diffusion-based generative neural network configured to:

receive the contextual embeddings; and process the contextual embeddings to generate, as output, an initial output image having an initial resolution; and one or more diffusion-based subsequent generative neural networks each configured to:

receive a respective input comprising: (i) the contextual embeddings, and (ii) a respective input image having a respective input resolution and generated as output by a preceding diffusion-based generative neural network in the sequence; and process the respective input to generate, as output, a respective output image having a respective output resolution that is higher than the respective input resolution, wherein for each subsequent diffusion-based generative neural network, processing the respective input to generate the respective output image comprises:

sampling a latent image having the respective output resolution; and denoising the latent image over a sequence of steps into the respective output image, comprising, for each step that is not a final step in the sequence of steps:

receiving a latent image for the step;

processing the respective input and the latent image for the step to generate an estimated image for the step;

dynamically thresholding pixel values of the estimated image for the step; and generating a latent image for a next step using at least the estimated image for the step.

\* \* \* \* \*